US012804759B2

(12) United States Patent
Kim

(10) Patent No.: US 12,804,759 B2
(45) Date of Patent: Nov. 17, 2026

(54) METHOD AND APPARATUS FOR PERFORMING RECONFIGURATION AND REPORTING DATA STATUS IN MOBILE WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 278 days.

(21) Appl. No.: 18/627,466

(22) Filed: Apr. 5, 2024

(65) Prior Publication Data

US 2024/0357687 A1 Oct. 24, 2024

(30) Foreign Application Priority Data

Apr. 19, 2023 (KR) ........................ 10-2023-0051241

(51) Int. Cl.
*H04W 76/20* (2018.01)
*H04W 28/06* (2009.01)
*H04W 80/02* (2009.01)

(52) U.S. Cl.
CPC ........... *H04W 76/20* (2018.02); *H04W 28/06* (2013.01); *H04W 80/02* (2013.01)

(58) Field of Classification Search
CPC ...... H04W 76/20; H04W 28/06; H04W 80/02
See application file for complete search history.

(56) References Cited

U.S. PATENT DOCUMENTS

2022/0078670 A1* 3/2022 Kung .................. H04W 36/085
2024/0357694 A1* 10/2024 Kim ...................... H04W 76/27

FOREIGN PATENT DOCUMENTS

WO WO-2022019345 A1 * 1/2022 .............. H04W 8/00
WO WO-2024167353 A1 * 8/2024 ............ H04W 28/06

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification (Release 17).

(Continued)

*Primary Examiner* — Duc C Ho
(74) *Attorney, Agent, or Firm* — Nicholas Park

(57) ABSTRACT

A method and apparatus to support XR services is provided. Method for supporting XR services includes receiving from a base station, a first Radio Resource Control (RRC) message, wherein the first RRC message comprises a one or more sets of logical channel group parameters, triggering a specific Medium Access Control (MAC) CE (Control Element) for a specific logical channel group based on remaining time until discard of one or more PDUs of the specific logical channel group, receiving from the base station a second RRC message, cancelling the specific MAC CE and triggering the specific MAC CE for the specific logical channel group after successful completion of the reconfiguration with synchronization from the first cell to the second cell. The specific MAC CE comprises a field indicating remaining time until discard.

19 Claims, 8 Drawing Sheets

(56) References Cited

OTHER PUBLICATIONS

3GPP TS 38.331 V17.4.0 (Mar. 2023); Technical Specification; 3rd Generation Partnership Project; Technical Specification Group Radio Access Network; NR; Radio Resource Control (RRC) protocol specification (Release 17).
Qualcomm Incorporated, "DRX enhancements for XR," 3GPP TSG-RAN WG2 Meeting #120, Toulouse France, R2-2211180, Nov. 14-18, 2022.
ZTE Corporation et al., "Scheduling enhancements for XR," 3GPP TSG-RAN2#120, Toulouse, France, R2-2211527, Nov. 14-18, 2022.
Nokia et al., "BS Tables for XR," 3GPP TSG-RAN WG2 Meeting #120, Toulouse, France, R2-2211600, Nov. 14-18, 2022.
Nokia et al., "XR Capacity Enhancements," 3GPP TSG-RAN WG2 Meeting #120, Toulouse, France, R2-2211601, R2-2209559, Nov. 14-18, 2022.
Futurewei, "Discussion on BSR enhancements," 3GPP TSG-RAN WG2 Meeting #120, Toulouse, France, R2-2212517, Nov. 14-18, 2022.
Ericsson, "Discussion on Scheduling enhancements," 3GPP TSG-RAN WG2 #120, Toulouse, France, R2-2212890, Nov. 14-18, 2022.
Huawei et al., "Further discussion on C-DRX enhancements for XR," 3GPP TSG-RAN WG2 Meeting #121, Athens, Greece, R2-2300118, Feb. 27-Mar. 3, 2023.
3GPP TR 38.835 V1.0.1 (Feb. 2023); Technical Report; 3rd Generation Partnership Project; Technical Specification Group Radio Access Network; NR; Study on XR enhancements for NR (Release 18), R2-2300152.
Qualcomm Incorporated, "Discussion on PDU discard," 3GPP TSG-RAN WG2 Meeting #121, R2-2300186, Athens, Feb. 27-Mar. 4, 2023.
Qualcomm Incorporated, "DRX enhancements for XR," 3GPP TSG-RAN WG2 Meeting #121, Athens, R2-2300188, Feb. 27-Mar. 4, 2023.
Intel Corporation, "RAN2 implications on PDU Set and Data Burst based on SA2 inputs," 3GPP TSG RAN WG2 Meeting #121, Athens, Greece, R2-2300428, Feb. 27-Mar. 3, 2023.
Ericsson, "Discussion on PDU Discard," 3GPP TSG-RAN WG2 #121, Athens, Greece, R2-2301509, Feb. 27-Mar. 3, 2023.
Ericsson, "Discussion on PDU Prioritization," 3GPP TSG-RAN WG2 #121, Athens, Greece, R2-2301511, Feb. 27-Mar. 3, 2023.

* cited by examiner

METHOD AND APPARATUS FOR PERFORMING RECONFIGURATION AND REPORTING DATA STATUS IN MOBILE WIRELESS COMMUNICATION SYSTEM

CROSS-REFERENCE TO RELATED APPLICATION

This application claims priority to and the benefit of Korean Patent Application No. 10-2023-0051241, filed on Apr. 19, 2023, the disclosure of which is incorporated herein by reference in its entirety.

BACKGROUND

Technical Field

The present disclosure relates to enhanced data status reporting for extended reality in a mobile communication system. More specifically, the present disclosure relates to buffer status reporting and delay status reporting.

RELATED ART

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability.

Extended Reality (XR) refers to all real-and-virtual combined environments and human-machine interactions generated by computer technology and wearables. XR is an umbrella term for different types of realities.

During a XR service, huge amount of Data Bursts may be generated and transmitted over NR downlink and uplink. Data Burst of XR services often have stringent delay budget. It requires more sophisticated uplink scheduling technique to achieve timely scheduling and to avoid excessive resource waste.

SUMMARY

Aspects of the present disclosure are to address the problems of XR traffic handling. The method includes receiving from a base station, a first Radio Resource Control (RRC) message, wherein the first RRC message comprises a one or more sets of logical channel group parameters, triggering a specific Medium Access Control (MAC) CE (Control Element) for a specific logical channel group based on remaining time until discard of one or more PDUs of the specific logical channel group, receiving from the base station a second RRC message, cancelling the specific MAC CE and triggering the specific MAC CE for the specific logical channel group after successful completion of the reconfiguration with synchronization from the first cell to the second cell. The specific MAC CE comprises a field indicating remaining time until discard.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

In this disclosure, means and apparatus to reduce the power consumption during XR service are provided.

Figure 1A:
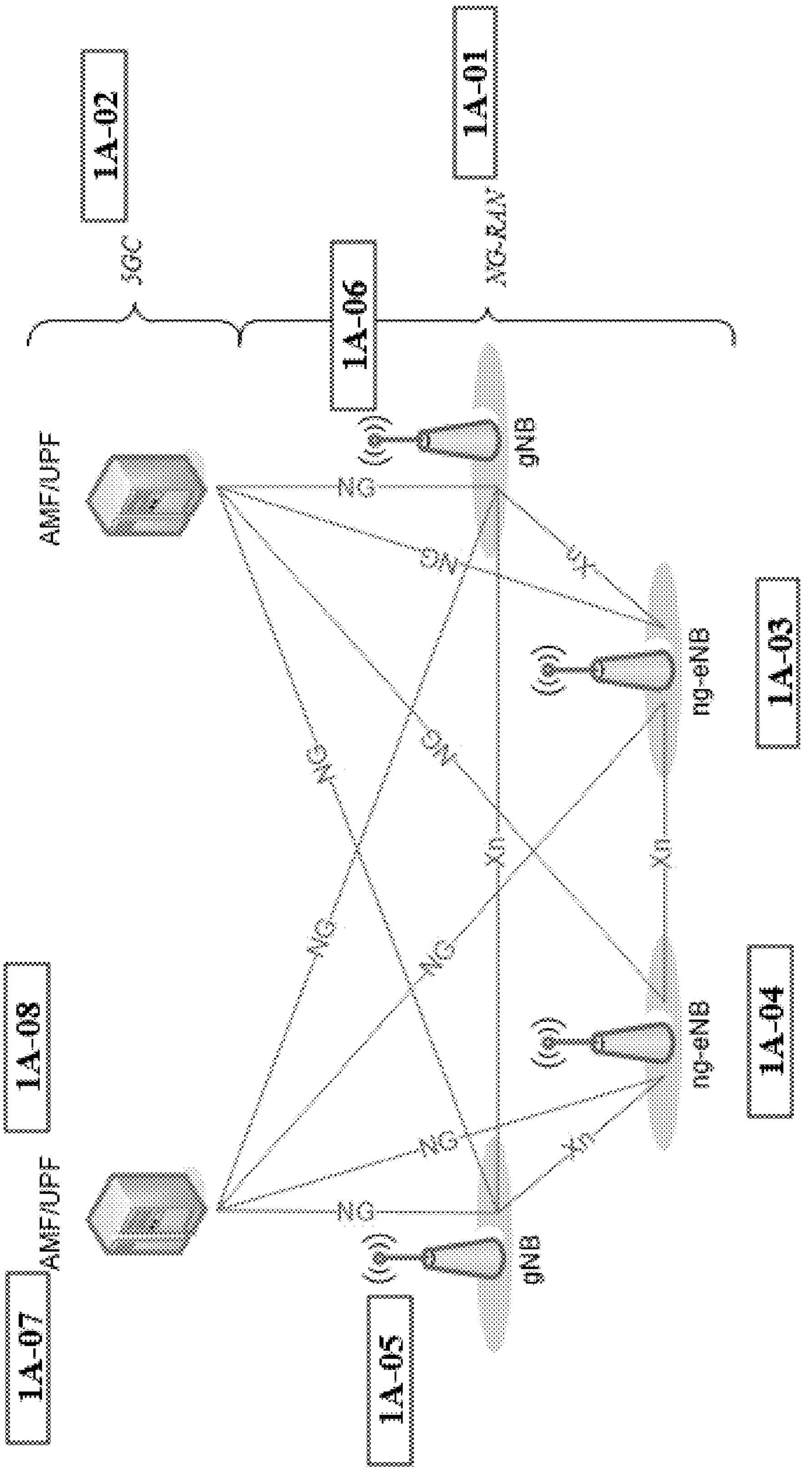
FIG. 1A is a diagram illustrating the architecture of an 5G system and a NG-RAN.

FIG. 1A is a diagram illustrating the architecture of an 5G system and a NG-RAN to which the disclosure may be applied.

5G system consists of NG-RAN (1A-01) and 5GC (1A-02). An NG-RAN node is either gNB (providing NR user plane and control plane protocol terminations towards the terminal) or an ng-eNB (providing E-UTRA user plane and control plane protocol terminations towards the terminal).

The gNBs (1A-05 or 1A-06) and ng-eNBs (1A-03 or 1A-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1A-07) and UPF (1A-08) may be realized as a physical node or as separate physical nodes.

A gNB (1A-05 or 1A-06) or an ng-eNBs (1A-03 or 1A-04) hosts the functions listed below.

- Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the terminal; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF (1A-07) hosts the functions such as NAS signaling, NAS signaling security, AS security control, SMF selection, Authentication, Mobility management and positioning management.

The UPF (1A-08) hosts the functions such as packet routing and forwarding, transport level packet marking in the uplink, QoS handling and the downlink, mobility anchoring for mobility etc.

Figure 1B:
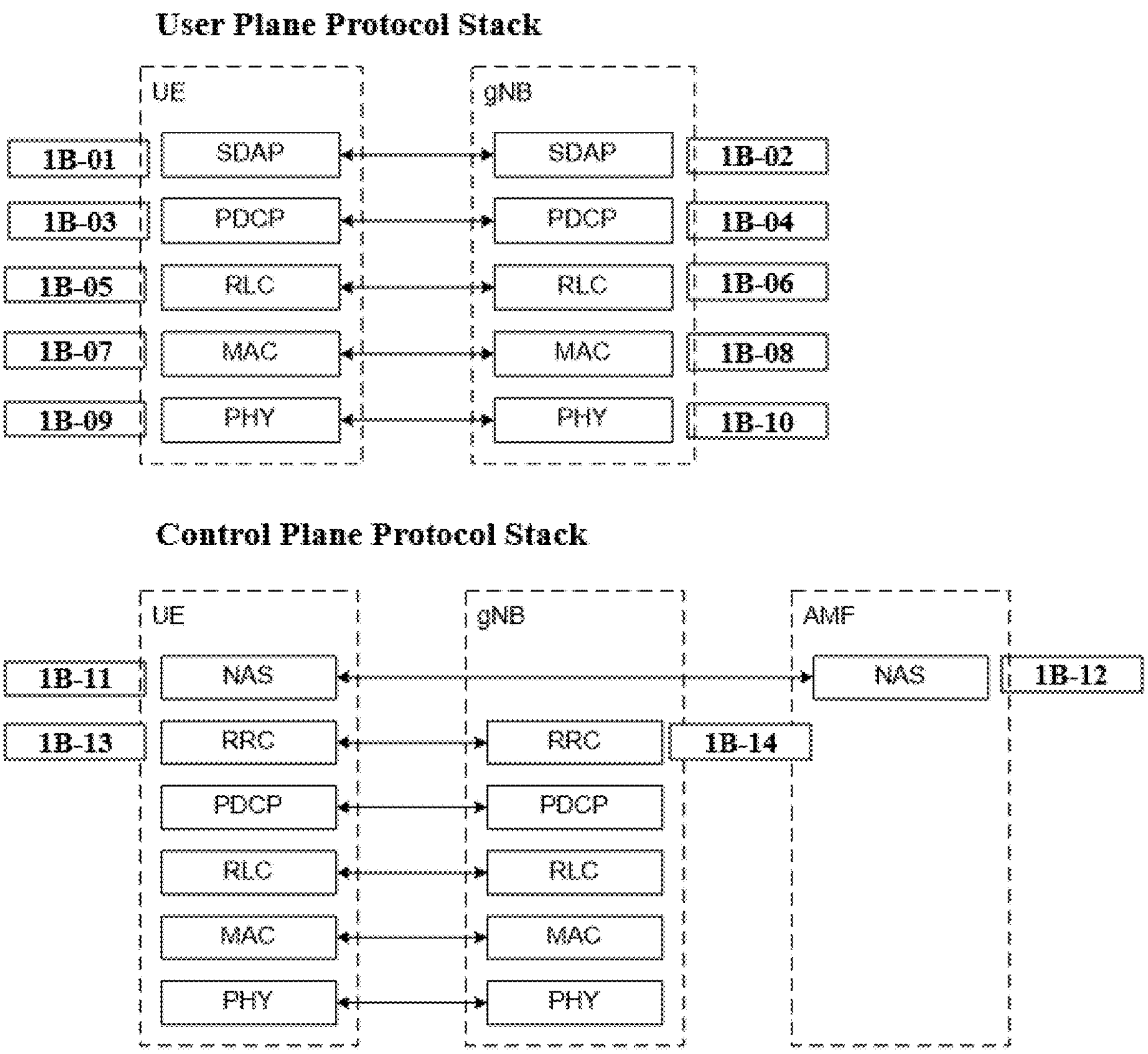
FIG. 1B is a diagram illustrating a wireless protocol architecture in an 5G system.

FIG. 1B is a diagram illustrating a wireless protocol architecture in an 5G system to which the disclosure may be applied.

User plane protocol stack consists of SDAP (1B-01 or 1B-02), PDCP (1B-03 or 1B-04), RLC (1B-05 or 1B-06), MAC (1B-07 or 1B-08) and PHY (1B-09 or 1B-10). Control plane protocol stack consists of NAS (1B-11 or 1B-12), RRC (**1*b*-13 or 1*b*-14**), PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 1C:
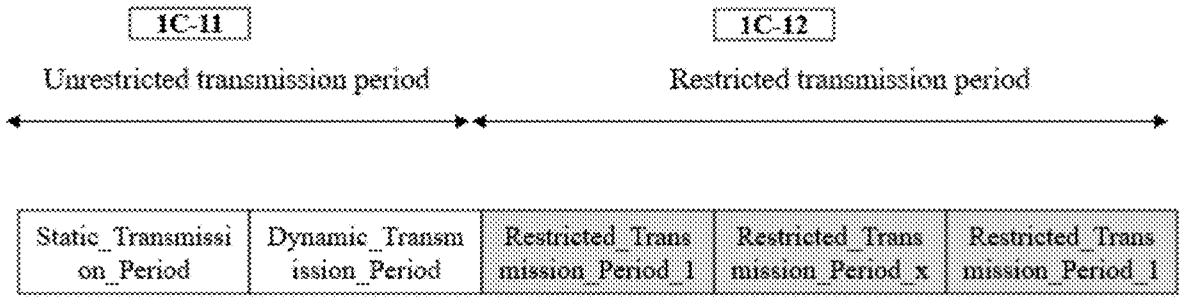
FIG. 1C is a diagram illustrating operation of discontinuous transmission according to an embodiment of the present invention.

FIG. 1C illustrates discontinuous transmission.

To provide the power consumption reduction, minimizing the duration for uplink transmission is required. To maintain performance, transmission of necessary uplink signal during an appropriate time point is also required. To strike the balance between them, various transmission periods and corresponding uplink signals are introduced as below.

In time domain, a time unit belongs either to an unrestricted transmission period 1C-11 or an restricted transmission period 1C-12. The time unit can be a slot or a subframe or a symbol.

The unrestricted transmission period further comprises following periods.

Static_Transmission_Period

During this period, the terminal performs transmissions for the following uplink signals.

Persistent/Periodic CSI (P-CSI) on PUCCH, Semi-Persistent CSI (SP-CSI) on PUCCH, SP-CSI on PUSCH, Aperiodic CSI (AP-CSI).

Persistent/Periodic SRS (P-SRS) on PUSCH, Semi-Persistent SRS (SP-SRS) on PUSCH, Aperiodic SRS (AP-SRS) on PUSCH.

HARQ feedback on PUCCH.

HARQ feedback on PUSCH.

PUSCH transmission based on configured grant.

PUSCH transmission based on dynamic grant.

Periodic Configured Grant Indication (P-CGI) on PUCCH.

P-CGI on PUSCH.

Dynamic_Transmission_Period

During this period, the terminal performs transmissions for the following uplink signals. The terminal minimize transmission on PUCCH by not transmitting P-CSI on PUCCH and SP-CSI on PUCCH. The terminal performs PUCCH transmission for P-CGI and HARQ feedback that are more important for maintaining performance.

SP-CSI on PUSCH, AP-CSI on PUSCH.

P-SRS on PUSCH, SP-SRS on PUSCH, AP-SRS on PUSCH.

HARQ feedback on PUCCH.

HARQ feedback on PUSCH.

PUSCH transmission based on configured grant.

PUSCH transmission based on dynamic grant.

Periodic Configured Grant Indication (P-CGI) on PUCCH.

P-CGI on PUSCH.

The restricted transmission period further comprises following periods.

Restricted_Transmission_Period_1

During this period, the terminal performs transmission for restricted set of uplink signals. For the tradeoff between power saving and network performance, the terminal restrict CSI transmission and SRS transmission. The terminal still performs P-CGI transmission and HARQ feedback transmission.

AP-CSI on PUSCH.

Aperiodic SRS (AP-SRS).

HARQ feedback on PUCCH.

HARQ feedback on PUSCH.

PUSCH transmission based on configured grant.

P-CGI on PUCCH.

P-CGI on PUSCH.

Restricted_Transmission_Period_2

During this period, the terminal performs uplink transmission for restricted set of uplink signals. To achieve more power saving, the terminal completely stop CSI transmission and SRS transmission. The terminal performs uplink transmissions for the following signal.

PUSCH transmission based on configured grant (depending on RRC configuration).

P-CGI on PUCCH.

P-CGI on PUSCH (depending on RRC configuration)

Restricted_Transmission_Period_3

During this period, the terminal performs uplink transmission for restricted set of uplink signals. Comparing to Restricted_Transmission_Period_2, PUSCH transmission for configured grant is allowed in Restricted_Transmission_Period_3.

PUSCH transmission based on configured grant.

P-CGI on PUCCH.

P-CGI on PUSCH (depending on RRC configuration).

Static_Transmission_Period and Restricted_Transmission_Period_2 and Restricted_Transmission_Period_3 occur periodically (with possibly different periodicity).

Dynamic_Transmission_Period occurs dynamically. More specifically, Dynamic_Transmission_Period occurs after a Static_Transmission_Period if a certain event occurs during the Static_Transmission_Period.

Restricted_Transmission_Period_1 occurs irregularly. Time period that is neither Static_Transmission_Period nor Dynamic_Transmission_Period nor Restricted_Transmission_Period_2 nor Restricted_Transmission_Period_3 is Restricted_Transmission_Period_1.

Maximum power saving is achieved during Restricted_Transmission_Period_2. Most power is consumed during Static_Transmission_Period.

By configuring Static_Transmission_Period and Dynamic_Transmission_Period and Restricted_Transmission_Period_2 and Restricted_Transmission_Period_3 appropriately, network can maximize the power saving with sustainable QoS for XR traffic.

Figure 1D:
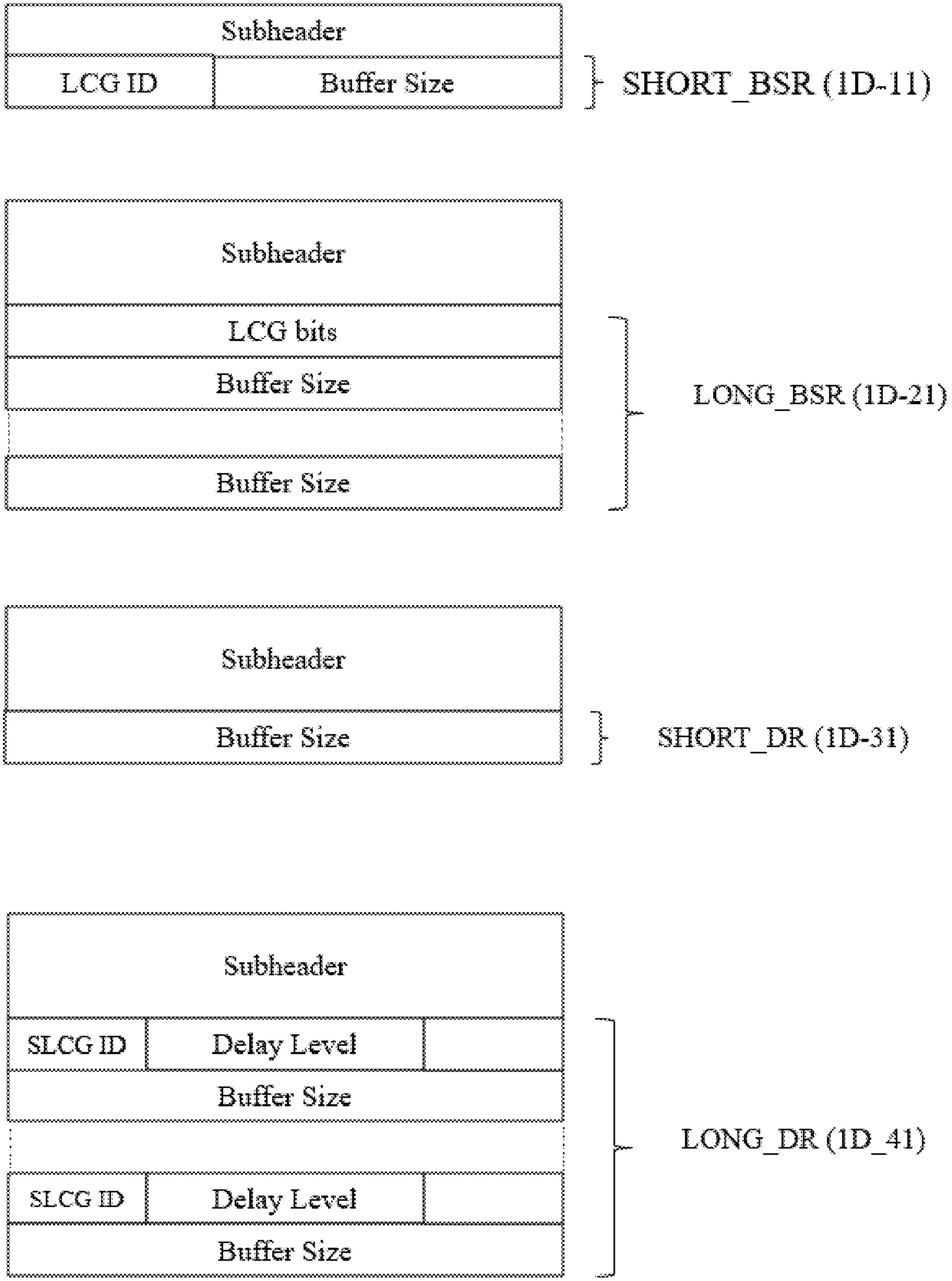
FIG. 1D is a diagram illustrating MAC CE for data status according to an embodiment of the present invention.

FIG. 1D illustrates the delay report and buffer status report.

Applications for XR services may generates PDU_SETs. A PDU_SET is one or more PDUs carrying the payload of one unit of information generated at the application level (e.g. frame(s) or video slice(s) etc for XR Services). All the PDUs of a PDU_SET are transmitted within the same QoS Flow. All the PDUs of a PDU_SET are governed by a same delay budget and a same error rate. A PDU_SET is considered as successfully delivered only when all PDUs of a PDU_SET are delivered successfully. If any PDU of a PDU_SET violate the delay budget, whole PDU_SET could be useless. To handle these aspects, two types of MAC CE are used to report the status of data stored in the buffer of logical channel groups in this disclosure. The first type MAC CE is BSR and the second type MAC CE is DR. By transmitting DR when delay budget violation is imminent, base station can perform proper scheduling to avoid the violation.

Buffer Status Report (BSR) has two formats. SHORT_BSR (1D-11) and LONG_BSR (1D-21). Delay Report (DR) has two formats. SHORT_DR (1D-31) and LONG_DR (1D_41).

SHORT_BSR includes a LCG ID field and a Buffer Size field. Subheader for SHORT_BSR includes a LCID field.

LONG_BSR includes one or more LCG bits and one or more Buffer Size field. Each bit of one or more LCG bits corresponds to an LCG. Subheader for LONG_BSR includes a LCID field and a L field.

SHORT_DR includes a Buffer Size field. Subheader for SHORT_DR includes a LCID field and an ELCID field.

LONG_DR includes one or more DELAY_COMPONENTs. Each of one or more DELAY_COMPONENTs include a LCG ID field and a Delay Level field and a Buffer Size field and a Buffer Table ID field. Subheader for LONG_DR includes a LCID field and a L field and an ELCID field.

The base station connected with the terminal determines various parameters for logical channels and logical channel groups and BSR and DR.

The base station transmits to the terminal one or more RRC message that contains the determined parameters.

A RRC message can include one or more logical channel configurations. Each of the logical channel provide a connection between a radio bearer and MAC. Each of the logical channel can be associated with a LCG. Each of the logical channel configuration includes following fields.

```
LogicalChannelConfig ::= SEQUENCE {
logicalChannelPriority INTEGER (1..16),
logicalChannelGroup    INTEGER (0..maxLCG-ID) OPTIONAL,
shortLCGId INTEGER (0..maxShortLCGID) OPTIONAL,
...
}
```

logicalChannelPriority field indicates the logical channel priority of the logical channel. Lower value means higher priority.

logicalChannelGroup field indicates LONG_LCG_ID of the logical channel group which the logical channel belongs to. If this field is absent and shortLCGId field is absent, the logical channel does not belong to any logical channel group. Data available in this logical channel does not trigger BSR and is not reported in BSR. maxLCG-ID is 7. The size of LCG ID in BSR MAC CE is 3 bit.

shortLCGId field indicates SHORT_LCG_ID of the logical channel group which the logical channel belongs to. This field can be present only if logicalChannelGroup field is absent. If this field is present and logicalChannelGroup field is absent, this logical channel belongs to logical channel group for which only SHORT_LCG_ID is configured. Data available in this logical channel does not trigger BSR and is not reported in BSR. Data available in this logical channel triggers DR and is reported in DR. maxShortLCG-ID is 3. The size of LCG ID in DR MAC CE is 2 bit.

A RRC message can includes one or more logical channel group configuration. Each of the logical channel group configuration includes following fields.

```
LogicalChannelGroupConfig ::= SEQUENCE {
logicalChannelGroup INTEGER (0..maxLCG-ID) OPTIONAL,
shortLCGId INTEGER (0..maxShortLCGID) OPTIONAL,
bsTableId    INTEGER (1..maxVariableBsTable) OPTIONAL,
delayIndexList       SEQUENCE (SIZE
(2..maxNrofDelayValue)) OF DelayValue,
drTriggerThreshold DelayValue
...
}
```

logicalChannelGroup field indicates LONG_LCG_ID of the logical channel group. This field is optionally present. If this field is absent, LONG_LCG_ID is not configured for the logical channel group. If this field is present, LONG_LCG_ID is configured for the logical channel group. The logical channel group configured with LONG_LCG_ID is LONG_LCG. In other embodiment, the logical channel group not configured with SHORT_LCG_ID is LONG_LCG. In other embodiment, the logical channel group not configured with delayIndexList is LONG_LCG.

shortLCGId field indicates SHORT_LCG_ID of the logical channel group. This field is optionally present. If this field is absent, SHORT_LCG_ID is not configured for the logical channel group. If this field is present, SHORT_LCG_ID is configured for the logical channel group. The logical channel group configured with SHORT_LCG_ID is SHORT_LCG. In other embodiment, the logical channel group configured with delayIndexList is SHORT_LCG.

The logical channel group that is configured with LONG_LCG_ID is LONG_LCG. A LONG_LCG affects BSR MAC CE (i.e, UL data in a LONG_LCG triggers BSR. UL data in a LONG_LCG is reported in BSR).

bsTableId indicates the ID of DYNAMIC_BS_TABLEs to be used for the logical channel group. This field is optionally present. If this field is absent, FIXED_BS_TABLEs are used for this logical group.

delayIndexList field includes one or more DelayValue Information Element (IE). This field is mandatorily present. DelayValue IE includes one of predefined values in the range of 1~100. DelayValue IE indicates a delay in ms. The delay of a PDU_SET could be either the elapsed time since first PDU of the PDU_SET arrives in a buffer of a logical channel group or a remaining time until the PDU_SET is discarded in the buffer of the logical channel group.

Terminal determines DELAY_INDEXs to be used for the logical channel group based on delayIndexList in the corresponding LogicalChannelGroupConfig.

<Start of DELAY_INDEX_DETMINATION>

The first DELAY_INDEX (i.e., DELAY_INDEX 0) indicates the delay between 0 ms and the first DELAY_VALUE ms.

The second DELAY_INDEX (i.e., DELAY_INDEX 1) indicates the delay between the first DELAY_VALUE ms and the second DELAY_VALUE ms.

The last DELAY_INDEX indicates the delay between the last DELAY_VALUE ms and DR_TRIGGER_THRESHODL ms. DR_TRIGGER_THRESHODL is indicated in drTriggerThreshold field.

<End of DELAY_INDEX_DETMINATION>

If a LogicalChannelGroupConfig is not configured for a logical channel group, the data/buffer status of logical channel group is reported only in the BSR MAC CE.

If a LogicalChannelGroupConfig is configured for a logical channel group, and

- if shortLCGId is absent (is not configured for the logical channel group),
  - the data/buffer status of the logical channel group is reported only in the BSR MAC CE.
- if shortLCGId is present (is configured for the logical channel group),
  - the data/buffer status of the logical channel group is reported both in the BSR MAC CE and in the DR MAC CE.
- if variableBsTableId is absent (is not configured for the logical channel group),
  - the data/buffer status of the logical channel group is determined based on FIXED_LONG_BS_TABLE and FIXED_SHORT_BS_TABLE
- if variableBsTableId is present (is configured for the logical channel group),
  - the data/buffer status of the logical channel group is determined based on the DYNAMIC_LONG_BS_TABLE and the DYNAMIC_SHORT_BS_TABLE, indicated by the variableBsTableId A RRC message can includes a buffer status report configuration. The buffer status report configuration includes following fields.

```
BSR-Config ::= SEQUENCE {
  periodicBSR-Timer ENUMERATED { sf1, sf5, sf10, sf16, sf20, sf32, ...}
  retxBSR-Timer ENUMERATED { sf10, sf20, sf40, sf80, sf160, ...}
  variableBSTableToAddModList SEQUENCE (SIZE (1..maxNrofBST)) OF VariableBSTableToAddMod
  elcidAdditoinalInfoList SEQUENCE (SIZE (1..maxNrofBST)) OF elcidAdditionalInfo
  ...
}
```

A VairableBSTableToAddMod is used to configure a DYNAMIC_LONG_BS_TABLE and a DYNAMIC_SHORT_BS_TABLE. The VairableBSTableToAddMod includes following fields.

```
VariableBSTableToAddMod::= SEQUENCE {
  bsTableId  INTEGER (1..maxVariableBsTable),
  lowerBoundIndexZer  INTEGER {0 .. 1500000}
  stepLong  INTEGER {1 .. 256}
}
```

bsTableId indicates the ID of the DYNAMIC_LONG_BS_TABLE and the DYNAMIC_SHORT_BS_TABLE associated with this configuration information (i.e., VariableBSTableToAddMod).

lowerBoundIndexZero field indicates LOWER_BOUND_INDEX_ZERO for the DYNAMIC_LONG_BS_TABLE and the DYNAMIC_SHORT_BS_TABLE associated with this configuration information (i.e., VariableBSTableToAddMod) and with the corresponding bsTableId.

stepLong field indicates STEP_LONG for the DYNAMIC_LONG_BS_TABLE associated with this configuration information (i.e., VariableBSTableToAddMod) and with the corresponding bsTableId.

Based on a VariableBSTableToAddMod, the terminal constructs a DYNAMIC_LONG_BS_TABLE and a DYNAMIC_SHORT_BS_TABLE as below.

An elcidAdditionalInfo is used to configure additional information to be conveyed in an ELCID for SHORT_DR. The additional information could be either delay or SHORT_LCG_ID or BS table identifier. The elcidAdditionalInfo includes following fields.

```
elcidAdditionalInfo::= SEQUENCE {
  elcid  INTEGER {0 .. 255}
  delayIndex  INTEGER {0 .. 15}
  shortLcgId  INTEGER {0 .. 3}
  bsTableId  INTEGER (1..maxVariableBsTable)
}
```

elcid field indicates the ELCID value to which the additional information is to be associate.

delayIndex field indicates a DELAY_INDEX that is an additional information associated with the ELCID value.

shortLcgId field indicates SHORT_LCG_ID that is an additional information associated with the ELCID value.

bsTableId field indicates the ID of the the DYNAMIC_SHORT_BS_TABLE that is an additional information associated with the ELCIID value.

The ELCID value indicated in this field indicates that the MAC CE corresponding to the ELCID is a SHORT_DR and that DELAY_INDEX indicated in the delayIndex field associated with the ELCID value is reported in the SHORT_DR and that the SHORT_DR is for SHORT_LCG indicated by shortLcgId field associated with the ELCID value and that Buffer Size field of the SHORT_DR is determined based on the DYNAMIC_SHORT_BS_TABLE indicated by bsTableId associated with the ELCID value.

Terminal uses two fixed BS tables (FIXED_LONG_BS_TABLE and FIXED_SHORT_BS_TABLE) for all LONG_LCGs (or all logical channel groups configured with LONG_LCG_ID) to determine BS index in BSR MAC CE.

FIXED_LONG_BS_TABLE comprises 256 FIXED_LONG_BS_INDEXs.

FIXED_SHORT_BS_TABLE comprises 64 FIXED_SHORT_BS_INDEXs.

FIXED_LONG_BS_TABLE and FIXED_SHORT_BS_TABLE are predefined in the specification. Terminal and base station does not exchange any explicit information for FIXED_LONG_BS_TABLE and FIXED_SHORT_BS_TABLE.

Terminal uses either fixed table pair (FIXED_LONG_BS_TABLE and FIXED_SHORT_BS_TABLE) or variable table pair (DYNAMIC_LONG_BS_TABLE and VARIALBE_SHORT_BS_TABLE) for a logical channel group to determine BS index in DR MAC CE. If bsTableId (or a parameter set for variable table construction) is indicated for the SHORT_LCG (or the logical channel group), corresponding variable table pair is used for the logical channel group in DR. If not, fixed table pair is used for the logical channel group in DR.

Variable table pair are constructed as below.

<Start of DYNAMIC_LONG_BS_TABLE Construction>

- DYNAMIC_LONG_BS_TABLE consists with a plurality of DYNAMIC_LONG_BS_INDEXs and their corresponding lower bunds and upper bounds,
- DYNAMIC_LONG_BS_INDEX x indicates a buffer status that amount of data in the buffer is equal to or greater than the lower bound of the BS_INDEX x and smaller than the upper bound of the BS_INDEX x.
- DYNAMIC_LONG_BS_INDEXs and corresponding buffer status are determined as below.
  - DYNAMIC_LONG_BS_INDEX 0 (the lowest index).
    - lower bound (minimum value) is LOWER_BOUND_INDEX_ZERO
    - upper bound (maximum value) is LOWER_BOUND_INDEX_ZERO+STEP_LONG
  - DYNAMIC_LONG_BS_INDEX 1.
    - lower bound (minimum value) is LOWER_BOUND_INDEX_ZERO+STEP_LONG+1
    - upper bound (maximum value) is LOWER_BOUND_INDEX_ZERO+2*STEP_LONG
  - DYNAMIC_LONG_BS_INDEX n. n is smaller than NUM_INDEX_LONG−1.
    - lower bound (minimum value) is LOWER_BOUND_INDEX_ZERO+n*STEP_LONG+1
    - upper bound (maximum value) is LOWER_BOUND_INDEX_ZERO+(n+1)*STEP_LONG
  - DYNAMIC_LONG_BS_INDEX m (the highest index). m is equal to NUM_INDEX_LONG−1.
    - lower bound (minimum value) is LOWER_BOUND_INDEX_ZERO+m*STEP_LONG+1
    - upper bound (maximum value) is infinity. Or upper bound does not exist for highest BS index.

<End of DYNAMIC_LONG_BS_TABLE Construction>

<Start of DYNAMIC_SHORT_BS_TABLE Construction>

- DYNAMIC_SHORT_BS_TABLE consists with another plurality of DYNAMIC_SHORT_BS_INDEXs and their corresponding lower bunds and upper bounds,
- DYNAMIC_SHORT_BS_INDEX x indicates a buffer status that the amount of data is equal to or greater than the lower bound of the BS_INDEX x and smaller than the upper bound of the BS_INDEX x.
- DYNAMIC_SHORT_BS_INDEXs and corresponding buffer status are determined as below.
  - DYNAMIC_SHORT_BS_INDEX 0.
    - lower bound (minimum value) is LOWER_BOUND_INDEX_ZERO
    - upper bound (maximum value) is LOWER_BOUND_INDEX_ZERO+STEP_SHORT
  - DYNAMIC_SHORT_BS_INDEX 1.
    - lower bound (minimum value) is LOWER_BOUND_INDEX_ZERO+STEP_SHORT+1
    - upper bound (maximum value) is LOWER_BOUND_INDEX_ZERO+2*STEP_SHORT
  - DYNAMIC_SHORT_BS_INDEX z; z is smaller than NUM_INDEX_SHORT−1.
    - lower bound (minimum value) is LOWER_BOUND_INDEX_ZERO+z*STEP_SHORT+1
    - upper bound (maximum value) is LOWER_BOUND_INDEX_ZERO+(z+1)*STEP_SHORT
  - DYNAMIC_SHORT_BS_INDEX w (highest index). w is equal to NUM_INDEX_SHORT−1.
    - lower bound (minimum value) is LOWER_BOUND_INDEX_ZERO+w*STEP_SHORT+1
    - upper bound (maximum value) is infinity. Or upper bound does not exist for highest BS index.
  - STEP_SHORT=STEP_LONG*NUM_INDEX_LONG/NUM_INDEX_SHORT <End of DYNAMIC_SHORT_BS_TABLE Construction>

A BSR is triggered if any of the following events occur:

- UL data, for a logical channel which belongs to a LONG_LCG, becomes available to the MAC entity; and either
  - this UL data belongs to a logical channel with higher priority than the priority of any logical channel containing available UL data which belong to any LONG_LCG; or
  - none of the logical channels which belong to a LONG_LCG contains any available UL data.
  - in which case the BSR is referred below to as 'Regular BSR';
- UL resources are allocated and number of padding bits is equal to or larger than the size of the Buffer Status Report MAC CE plus its subheader, in which case the BSR is referred below to as 'Padding BSR';
- retxBSR-Timer expires, and at least one of the logical channels which belong to an LCG contains UL data, in which case the BSR is referred below to as 'Regular BSR';
- periodicBSR-Timer expires, in which case the BSR is referred below to as 'Periodic BSR'.

A DR is triggered if any of the following events occur:

- UL data, for a logical channel which belongs to a SHORT_LCG, becomes available to the MAC entity; and either
  - this UL data belongs to a logical channel with higher priority than the priority of any logical channel containing available UL data which belong to any SHORT_LCG; or none of the logical channels which belong to a SHORT_LCG contains any available UL data.

the remaining time until discard of a PDU_SET, for one or more logical channel which belongs to a SHORT_LCG, becomes less than DR_TRIGGER_THRESHODL for a first time.

A data available for transmission is new data available for transmission if a DR for the data has not been transmitted. Once DR is reported for the data, the data is not considered new data available for transmission.

A BSR is triggered based on data in the first logical channels. A DR is triggered based on data in the second logical channels. The first logical channel is a logical channel which belongs to a LONG_LCG. The second logical channel is a logical channel which belongs to a SHORT_LCG.

A logical channel can belong to a LONG_LCG and a SHORT_LCG at a same time. Hence new data arrival in the logical channel can trigger both BSR and DR.

If both BSR and DR are triggered for the new data in a logical channel,
- the terminal cancels the BSR and performs necessary procedure to transmit the DR.
- in another embodiment,
  - if the priority of the data that triggered BSR is lower than or equal to the priority of the data that triggered DR,
    - the terminal cancels BSR and performs necessary procedure to transmit DR,
  - if the priority of the data that triggered BSR is higher than the priority of the data that triggered DR,
    - the terminal cancels DR and performs necessary procedure to transmit BSR.

If both DR and Periodic BSR are triggered, DR is prioritized (i.e., DR is transmitted and Periodic BSR is cancelled or UL resource is allocated to DR first and to BSR next).

If a PDU_SET is discarded and if DR was triggered for the PDU_SET, the terminal cancels the triggered DR and triggers Regular BSR.

For Regular and Periodic BSR, the terminal determines BSR format as below.
- if more than one LONG_LCG has data available for transmission when the MAC PDU containing the BSR is to be built:
  - report Long BSR for all LONG_LCGs which have data available for transmission.
- if only one LONG_LCG has data available for transmission when the MAC PDU containing the BSR is to be built:
  - report Short BSR.

For BSR triggered by retxBSR-Timer expiry, the terminal considers that the logical channel that triggered the BSR is the highest priority logical channel that has data available for transmission at the time the BSR is triggered.

The terminal determines DR format as below.
- if more than one SHORT_LCG has new data available for transmission when the MAC PDU containing the DR is to be built:
  - report LONG_DR for all SHORT_LCGs which have new data available for transmission.
- if only one SHORT_LCG has new data available for transmission when the MAC PDU containing the DR is to be built:
  - report SHORT_DR.
- if more than one SHORT_LCG has PDU_SETs of which remaining time until discard is less than DR_TRIGGER_THRESHOLD when the MAC PDU containing the DR is to be built:
  - report LONG_DR for all SHORT_LCGs which have PDU_SETs of which remaining time until discard is less than DR_TRIGGER_THRESHOLD.
- if only one SHORT_LCG has PDU_SETs of which remaining time until discard is less than DR_TRIGGER_THRESHODL when the MAC PDU containing the DR is to be built:
  - report SHORT_DR.

SHORT_BSR consists of a LCG ID field and a Buffer Size field. Subheader for SHORT_BSR includes a LCID field.

The terminal includes LONG_LCG_ID of the logical channel group in the LCG ID field.

The terminal includes a FIXED_SHORT_BS_INDEX in the Buffer Size field.

The terminal includes a specific LCID value in the LCID field in the subheader. The specific LCID value indicates SHORT_BSR.

LONG_BSR consists of one or more LCG bits and one or more Buffer Size field. Each bit of one or more LCG bits corresponds to a LONG_LCG. Subheader for LONG_BSR includes a LCID field and a L field.

The terminal sets LCG bits based on the LONG_LCG_ID of LONG_LCG for which buffer status is reported.

The terminal includes a FIXED_LONG_BS_INDEX in each of the one or more Buffer Size fields.

The terminal includes a specific LCID value in the LCID field in the subheader. The specific LCID value indicates LONG_BSR.

The Buffer Size field in the SHORT_BSR is shorter than the Buffer Size field in the LONG_BSR.

SHORT_DR consists of a Buffer Size field. Subheader for SHORT_DR includes a LCID field and an ELCID field.

The terminal includes a DYNAMIC_SHORT_BS_INDEX in the Buffer Size field.

The terminal determines the DYNAMIC_SHORT_BS_INDEX based on the DYNAMIC_SHORT_BS_TABLE associated with (constructed from) a first parameter set for a SHORT_LCG that triggered the SHORT_DR.

In a second embodiment, the terminal determines the DYNAMIC_SHORT_BS_INDEX based on the DYNAMIC_SHORT_BS_TABLE indicated by ELCID value.

The first parameter set includes a LOWER_BOUND_INDEX_ZERO and a STEP_SHORT and a NUM_INDEX_SHORT.

The LOWER_BOUND_INDEX_ZERO and STEP_LONG are indicated in the IEs associated with the logical channel group. The NUM_INDEX_SHORT and the NUM_INDEX_LONG are fixed in the specification as e.g. 64 and 256 respectively. Terminal and base station does not exchange any explicit information for NUM_INDEX_SHORT and NUM_INDEX_LONG. The STEP_SHORT is derived from the NUM_INDEX_SHORT and NUM_INDEX_LONG and the STEP_LONG. The reason behind this is to make the lowest bound and highest bound of two tables aligned.

The terminal includes a fixed LCID value in the LCID field. The fixed LCID value indicates that ELCID field follows in the subheader.

The terminal includes an ELCID value in the ELCID field. Two or more ELCIDs can be configured to indicate SHORT_DR. The terminal selects an ELCID value for SHORT_DR based on the SHORT_LCG_ID and DELAY_INDEX to be reported.

LCID value is an integer between 0 and 255. ELCID value is an integer between 0 and 255.

LONG_DR includes one or more DELAY_COMPONENTs. Each of one or more DELAY_COMPONENTs include a SLCG ID field and a Delay Level field and and a Buffer Table ID field and a Buffer Size field. Subheader for LONG_DR includes a LCID field and a L field and an ELCID field.

The terminal includes a SHORT_LCG_ID in the SLCG ID field.

The terminal includes a DYNAMIC_LONG_BS_INDEX in the Buffer Size field.

The terminal determines the DYNAMIC_LONG_BS_INDEX based on the DYNAMIC_LONG_BS_TABLE associated with (constructed from) a second parameter set of the SHORT_LCG_ID.

In a second embodiment, the terminal determines the DYNAMIC_LONG_BS_INDEX based on the DYNAMIC_LONG_BS_TABLE indicated by bsTableId field.

The second parameter set includes a LOWER_BOUND_INDEX_ZERO and a STEP_LONG and a NUM_INDEX_LONG.

The terminal includes a DELAY_INDEX in the Delay Level field.

The terminal determines the DELAY_INDEX based on one or more DelayValue IEs of the corresponding SHORT_LCG.

The terminal includes a fixed LCID value in the LCID field. The fixed LCID value indicates that ELCID field follows in the subheader.

The terminal includes an ELCID value in the ELCID field. The ELCID value indicates that the MAC CE corresponding to the ELCID is LONG_DR.

For uplink transmission, the terminal allocates the uplink resource for each logical channel and MAC CEs according to logical channel priority. Higher the priority, more resource allocated. The process of allocating uplink resource based on priority is called logical channel prioritization.

Logical channels shall be prioritised in accordance with the following order (highest priority listed first):

- MAC CE for C-RNTI, or data from UL-CCCH;
  - MAC CE for C-RNTI is transmitted during random access procedure for contention resolution. MAC CE for C-RNTI includes C-RNTI of the terminal.
  - data from UL-CCCH is RRC messages like RRCSetupRequest and RRCResumeRequest
- MAC CE for data status reporting (BSR and DR), with exception of BSR included for padding;
  - Regular BSR and Periodic BSR and DR have higher priority than MAC CE for power headroom and lower priority than C-RNTI MAC CE and UL-CCCH.
  - The priority between Periodic BSR and DR is determined based on the priority of data that is reported in the MAC CE.
    - If both Periodic BSR and DR are pending (triggered and not cancelled), the relative priority between them is determined based on the highest priority of LONG_LCG that is reported in the BSR and the highest priority of SHORT_LCG that is reported in the DR
  - The priority between Regular BSR and DR is determined based on the priority of data that triggered the MAC CE.
    - If Regular BSR and DR are pending (triggered and not cancelled), the relative priority between them is determined based on the priority of LONG_LCG that triggered the regular BSR and the priority of SHORT_LCG that triggered DR.
    - If both priorities are same (e.g. same logical channel group triggers both Regular BSR and DR), The priority of DR is higher than the priority of BSR.
- MAC CE for power headroom reporting;
  - MAC CE for power headroom reporting includes information on the difference between maximum transmission power and currently used power.
- MAC CE for Positioning Measurement Gap Activation/Deactivation Request;
- Depending on configuration, one or more gaps can be configured for a terminal. Based on a given circumstances, the terminal may request to activate one of them by transmitting above MAC CE.
- data from any Logical Channel, except data from UL-CCCH;
  - data from SRB1, SRB2 and DRBs belong to this.
- MAC CE for BSR included for padding;
  - MAC CE for BSR can be included instead of padding.

Terminal performs following operations.

The terminal receives a downlink RRC message from the base station, the downlink RRC message comprises a one or more logical channel configuration IEs and a one or more logical channel group configuration IEs and one or more ELCID configuration IEs.

Each of the one or more logical channel configuration IE comprises a normal logical channel group identifier that indicates a logical channel group to which the corresponding logical channel belongs.

Each of the one or more logical channel group configuration IE comprises optionally the normal logical channel group identifier and optionally a shorten logical channel group identifier.

The terminal determines the mapping between a one or more logical channels and a logical channel group based on the one or more logical channel configuration IEs.

Each of the one or more ELCID configuration IE comprises a first field (ELCID field) and a second field (bsTableId field) and a third field (delayIndex field). The first field indicates an ELCID value associated with a buffer size table and a delay index. The second field indicates the buffer size table. The third field indicates the delay index.

The terminal determines the mapping between a normal logical channel group identifier and a shorten logical channel group identifier based on one or more logical channel group configuration IEs.

The terminal constructs two tables for a logical channel group if the logical channel group configuration IE of the logical channel group comprises a field indicating shorten identifier for the logical channel group.

The terminal constructs two tables for a logical channel group if the logical channel group configuration IE of the logical channel group comprises information related with constructed tables (bsTableId or LOWER_BOUND_INDEX_ZERO or STEP_LONG).

The first table (DYNAMIC_LONG_BS_TABLE) of the logical channel is constructed/generated/built based on a first field (LOWER_BOUND_INDEX_ZERO) and a second field (STEP_LONG) and a first constant (NUM_INDEX_LONG).

The second table (DYNAMIC_SHORT_BS_TABLE) is constructed/generated/built based on the first field and a first parameter (STEP_SHORT) and a second constant (NUM_INDEX_SHORT).

The first field and the second field are configured for the logical channel group. The first field and the second field are delivered to the terminal as included in the downlink RRC message.

The first constant and the second constant are fixed integers. The terminal and the base station are aware of the values for the first constant and the second constant without message exchange.

The first parameter is calculated from the second field and the first constant and the second constant.

The first table comprises n buffer size level entries. The second table comprises m buffer size level entries. A buffer size level entry consists of a Buffer Size Index and a Buffer Size value.

The terminal determines DELAY_INDEXs for the logical channel group based on two or more DELAY IEs. Each DELAY IE indicates a specific multiple msec. The first/lowest DELAY_INDEX is determined based on a first fixed value and the first IE. The last/highest DELAY_INDEX is determined based on the last IE and a second parameter. The intermediate DELAY_INDEX n is determined based on the nth DELAY IE and (n+1)th DELAY IE.

The second parameter is related to DR MAC CE trigger.

The terminal triggers a MAC CE to report status of data stored in the logical channel group.

The terminal sets the Buffer Size field in the MAC CE based on either the first table or the second table or a third table or a fourth table.

If the MAC CE is a first type MAC CE (LONG_DR), Buffer Size field is determined based on the first table (DYNAMIC_LONG_BS_TABLE).

If the MAC CE is a second type MAC CE (SHORT_DR), Buffer Size field is determined based on the second table (DYNAMIC_SHORT_BS_TABLE).

If the MAC CE is a third type MAC CE (LONG_BSR), Buffer Size field is determined based on the third table (FFIXED_LONG_BS_TABLE).

If the MAC CE is a fourth type MAC CE (SHORT_BSR), Buffer Size field is determined based on the fourth table (FIXED_SHORT_BS_TABLE).

The terminal sets a logical channel group identifier field in the MAC CE based on either a normal logical channel group identifier (LONG_LCG_ID) or a shorten logical channel group identifier (SHORT_LCG_ID).

If the MAC CE is a second type MAC CE (SHORT_DR), the logical channel group identifier field in the MAC CE is set to the shorten logical channel group identifier of the logical channel group.

If the MAC CE is a fourth type MAC CE (SHORT_BSR), the logical channel group identifier field in the MAC CE is set to the normal logical channel group identifier of the logical channel group.

The terminal determines values to be set to a LCID field and an ELCID field for the MAC CE.

If the MAC CE is a first type MAC CE (LONG_DR), LCID field is set to a first value (33) and ELCID field is set to a second value. The first value and the second value are fixed integers. Delay Level field is set to a value indicating the delay of the PDU_SET in the logical channel group. Buffer Table ID field is set to a value indicating a buffer table that are used to determine Buffer Index. Buffer Size field is set to a Buffer Index determined based on the the buffer table and the amount of data in the logical channel group. Delay Level field is set to a value indicating the delay of the data. Delay Level field for the logical channel group is determined based on the DELAY_INDEXs of the logical channel group.

If the MAC CE is a second type MAC CE (SHORT_DR), LCID field is set to the first value (33) and ELCID field is set to a third value. The third value is an integer selected from a set of integers. The set of integers consists of a two or more first integers. If a first integer is set to the ELCID field, the first integer indicate that the type of the corresponding MAC CE is the second type MAC CE and the corresponding MAC CE is for a specific logical channel group. The mapping between the first integer and the specific logical channel group is determined by the base station and provided in a downlink RRC message. Alternatively, if a first integer is set to the ELCID field, the first integer indicate that the type of the corresponding MAC CE is the second type MAC CE and that the Buffer Index in the Buffer Size field of the corresponding MAC CE is determined based on a specific buffer table and that Delay Index associated with the data is a specific value. The mapping between the first integer and the specific buffer table and the specific value for Delay Index is determined by the base station and provided in a downlink RRC message.

If the MAC CE is a LONG_BSR, LCID field is set to a fourth value. The fourth value is a fixed integer. LCG bits are set based on normal logical channel group identifiers of the logical channel groups reported in the third type MAC CE.

If the MAC CE is a SHORT_BSR, LCID field is set to a fifth value. The fifth value is a fixed integer. LCG ID field is set to the normal logical channel group identifier of the logical channel group reported in the fourth type MAC CE.

The terminal performs transmission of the MAC CE based on the priority of the MAC CE.

The priority between the first type MAC CE (BSR) and the second type MAC CE (DR) is variable depending on highest priority of logical channel group that are reported in the MAC CE, if the first type MAC CE is triggered due to new data arrival.

The priority between the first type MAC CE (BSR) and the second type MAC CE (DR) is fixed such that the second type MAC CE has higher priority than the first type MAC CE, if the first type MAC CE is triggered due to expiry of periodic timer.

The priority between a third MAC CE (C-RNTI MAC CE) and the second type MAC CE and a fourth type MAC CE (PHR MAC CE) are fixed such that the third type MAC CE has higher priority than the second type MAC CE and the second type MAC CE has higher priority than the fourth type MAC CE.

For a logical channel group for which only normal logical channel group identifier (LONG_LCG_ID) is configured, the status of the data of the logical channel group is reported only in the first type MAC CE (BSR). The Buffer Size of the logical channel group is determined based on a third table or a fourth table.

For a logical channel group for which only shorten logical channel group identifier (SHORT_LCG_ID) is configured, the status of the data of the logical channel group is reported only in the second type MAC CE (BSR). The Buffer Size of the logical channel group is determined based on a first table or a second table.

For a logical channel of logical channel group for which both normal logical channel group identifier and shorten logical channel group identifier are configured, the status of the data is reported both in the first type MAC CE and in the second type MAC CE. The Buffer Size of the logical channel group is determined based on a third table or a fourth table in the first type MAC CE. The Buffer Size of the logical channel group is determined based on a first table or a second table in the second type MAC CE.

Figure 2A:
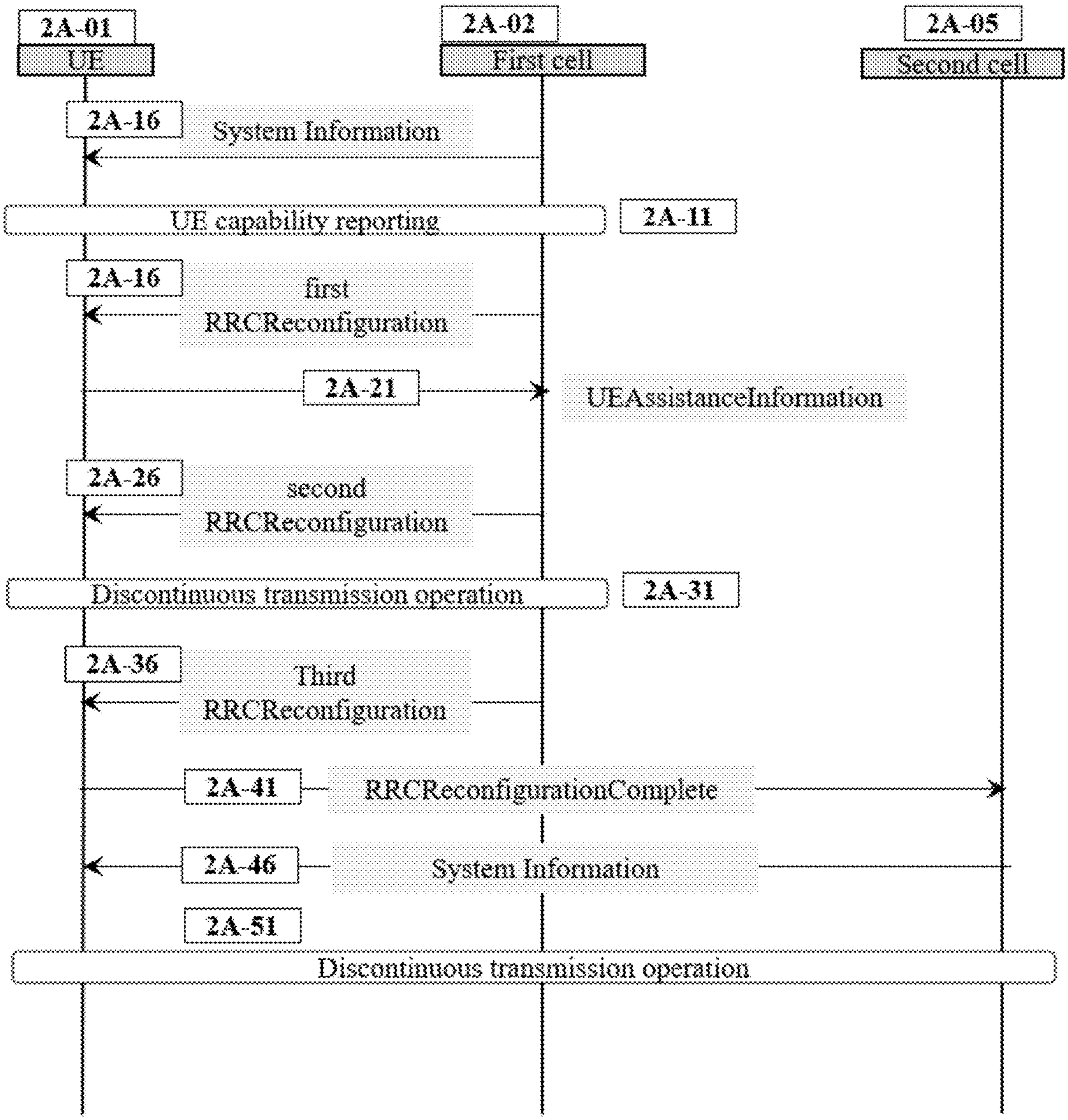
FIG. 2A is a diagram illustrating operations of the terminal and a base station according to an embodiment of the present invention.

FIG. 2A illustrates the operations of the terminal and base station according to the embodiments of the invention.

In 2A-06, the terminal receives a system information in a first cell from a base station. The system information includes following fields.

frame_number: This field indicates an integer between 0 and 1023. It increments by one every radio frame.

The terminal initializes the first_counter with the received frame_number.

In 2A-11, the terminal transmits a UECapabilityInformation to the base station.

The UECapabiiltyInformation includes following fields.

a first capability information indicates whether the terminal supports reporting of one or more uplink traffic patterns for a radio bearer.

a second capability information indicates whether the terminal supports Static_Transmission_Period_Determination_mode_2. If the terminal supports Static_Transmission_Period_Determination_mode_2, the terminal shall also support non-integer value periodicity for DTX operation.

a third capability information indicates whether the terminal supports Restricted_Transmission_Period_2.

a fourth capability information indicates whether the terminal supports Restricted_Transmission_Period_3.

a fifth capability information indicates whether the terminal supports Delay Report. If the fifth capability information is present in the UECapabiiltyInformation, the terminal supports following functionalities.

Functionality to construct the DYNAMIC_LONG_BS_TABLE and DYNAMIC_SHORT_BS_TABLE based on signaled RRC parameters Functionality to construct the DELAY_INDEXs based on signaled RRC parameters Functionality to associate ELCID value and additional information The base station determines configurations for the terminal based on the capability information.

In 2A-16, the terminal receives a RRCReconfiguration from the base station.

The RRCReconfiguration can include one or more radio bearer configurations. Each radio bearer configuration includes following fields.

radio bearer identifier.

PDCP configuration.

indicator for PDCP reestablishment.

indicator for PDCP recovery.

PDU session identifier.

one or more QoS flow Identifiers.

The terminal establishes PDCP entities and radio bearers based on the radio bearer configurations.

The RRCReconfiguration can include MAC configuration information which includes following fields.

The terminal configures BSR based on the BSR configuration.

The RRCReconfiguration can include CSI configuration information and SRS configuration information.

Channel State Information (CSI) is information on channel state estimated over certain reference signals. CSI is transmitted either on PUCCH or on PUSCH. CSI is transmitted either periodically or semi-persistently or aperiodically.

CSI configuration information includes following information.

CSI format information that indicates the number of bits for CSI and the type of CSI information to be reported.

CSI type information that indicates whether the CSI is periodic CSI or semi-persistent CSI or aperiodic CSI.

Time pattern information for periodic CSI and semi-persistent CSI. This information indicates the periodicity and offset of subframe where CSI is transmitted.

Time pattern information for aperiodic CSI. This information indicates time distance between DCI reception and CSI reporting.

PUCCH resource information for periodic CSI. This information indicates the identifier of PUCCH resource to be used for periodic CSI reporting.

PUCCH resource information for semi-persistent CSI. This information indicates the identifier of PUCCH resource to be used for semi-persistent CSI reporting.

Periodic CSI (P-CSI) is transmitted in PUCCH. Terminal starts P-CSI transmission when P-CSI is configured by a RRCReconfiguration. Terminal stops P-CSI transmission when P-CSI is released by a RRCReconfiguration.

Semi-Persistent CSI (SP-CSI) is transmitted either in PUCCH or PUSCH. Terminal starts SP-CSI on PUCCH when a MAC CE activating SP-CSI is received. Terminal stops SP-CSI on PUCCH when a MAC CE deactivating SP-CSI is received. Terminal starts SP-CSI on PUSCH when a DCI activating SP-CSI on PUSCH is received. Terminal stops SP-CSI on PUSCH when a DCI deactivating SP-CSI on PUSCH is received.

Aperiodic CSI (AP-CSI) is transmitted in PUSCH. Terminal transmits AP-CSI one time when a DCI activating AP-CSI is received.

Sounding Reference Signal (SRS) is transmitted by terminal for the base station to estimate the channel quality. SRS is transmitted on PUSCH. SRS is transmitted either periodically or semi-persistently or aperiodically.

SRS configuration information includes following information.

SRS type information that indicates whether the SRS is periodic SRS (P-SRS) or semi-persistent SRS (SP-SRS) or aperiodic SRS (AP-SRS).

Time pattern information for periodic SRS and semi-persistent SRS. This information indicates the periodicity and offset of subframe where SRS is transmitted. This information also indicates which symbols of the subframe is used for SRS transmission.

Time pattern information for aperiodic SRS. This information indicates time distance between DCI reception and SRS reporting.

PUSCH resource information for periodic SRS. This information indicates resource blocks for SRS transmission.

The RRCReconfiguration can include UEAssistanceInformation configuration information which includes following fields.

uplink_traffic_pattern_reporting_indication.

List of radio bearer identifiers: List of radio bearers for which uplink traffic pattern reporting is allowed.

If the base station is capable of configuring DTX based on uplink traffic pattern and the terminal reported that it can report uplink traffic pattern, the base station includes Indication_uplink_traffic_pattern_reporting.

The terminal considers uplink traffic pattern reporting for XR traffic is allowed based on that uplink_traffic_pattern_reporting_indication is present.

In 2A-21, the terminal transmits a UEAssistanceInformation to the base station.

UE determines the traffic pattern information for a radio bearer if the radio bearer is configured for XR traffic (e.g. QoS flows for NR are served by the radio bearer).

When uplink traffic is generated for the radio bearers indicated by the list of radio bearer identifiers, the terminal determines the traffic pattern. The terminal creates uplink traffic pattern information. If one pattern is not enough, more than one patterns can be created.

The terminal generates UEAssistanceInformation for uplink traffic pattern reporting.

The UEAssistanceInformation includes following fields.

Uplink_Traffic_Pattern_Information.

- radio_bearer_Identifier: This field indicates the radio bearer where the uplink traffic is served.
- one or multiple pattern_Info. Each pattern_info comprises following fields.
  - PDU_arrival_offset: this field indicates the estimated timing for a specific PDU_SET arrival in the uplink of the corresponding bearer.
  - PDU_arrival_periodicity: this field indicates the estimated PDU_SET arrival periodicity in the uplink of the corresponding bearer.

Each pattern corresponds to a specific time pattern indicated by the corresponding PDU_arrival_offset and the corresponding PDU_arrival_periodicity.

The base station determines DTX configurations based on the uplink traffic patterns reported by the terminal and the downlink traffic patterns observed by the base station itself.

The base station determines uplink configured grant configurations based on the uplink traffic patterns reported by the terminal.

In 2A-26, the base station transmits a second RRCReconfiguration to the terminal.

The second RRCReconfiguration includes DTX configurations and configured grant configurations and logical channel group configurations and buffer status report configurations.

If the RRCReconfiguration includes DTX configurations, the terminal and the base station performs DTX operation. If DTX is configured for the terminal, the terminal transmits specific set of uplink signals during various transmission periods. Serving Cells of ae terminal may be configured by RRC in two DTX groups with separate DTX parameters. When RRC does not configure a secondary DTX group, there is only one DTX group and all Serving Cells belong to that one DTX group. When two DTX groups are configured, each Serving Cell is uniquely assigned to either of the two groups. The DTX parameters that are separately configured for each DTX group are Static_Transmission_Timer and Dynamic_Transmission_Timer and DTX_Cycle_Offset2. The DTX parameters that are common to the DTX groups are DTX-SlotOffset and DTX_Cycle_Offset and Static_Transmission_Period_Determination_2 and BigFrameNumber and ReferenceFrameNumber2.

Various DTX configurations can be included in a MAC-CellGroupConfig in a RRCReconfiugration.

```
A MAC-CellGroupConfig can includes DTX configurations as shown below.
  MAC-CellGroupConfig ::= SEQUENCE {
  DTX-Config SetupRelease { DTX-Config } OPTIONAL, -- Need M
  DTX-ConfigSecondary   SetupRelease { DTX-ConfigSecondary }
OPTIONAL -- Need M
  ]],
  DTX2-ConfigSetupRelease { DTX2-Config } OPTIONAL, -- Need M
  DTX2-ConfigSecondary   SetupRelease { DTX2-Config } OPTIONAL,
-- Need M
```

-continued

```
DTX3-ConfigDTX3-Config OPTIONAL, -- Need R
DTX3-ConfigSecondaryGroup   DTX3-Config OPTIONAL, -- Need R
DTX4-ConfigSetupRelease { DTX4-Config } OPTIONAL, -- Need M
DTX5-ConfigSetupRelease { DTX5-Config } OPTIONAL, -- Need M
...
}
```

DTX-Config includes DTX configuration for the primary DTX group. This Information Element (IE) includes fields shown below.

```
DTX-Config ::= SEQUENCE {
   Static_Transmission_Timer CHOICE {
subMilliSeconds INTEGER (1..31),
milliSeconds ENUMERATED {
ms1, ms2,... }
                                                              },
   Dynamic_Transmission_Timer     ENUMERATED {ms0, ms1, ms2,
... },
   DTX_Cycle_Offset            CHOICE {
ms10 INTEGER(0..9),
ms20 INTEGER(0..19),
ms32 INTEGER(0..31),
ms40 INTEGER(0..39),
ms60 INTEGER(0..59),
ms64 INTEGER(0..63),
ms70 INTEGER(0..69),
ms80 INTEGER(0..79),
ms128 INTEGER(0..127),
ms160 INTEGER(0..159),
ms256 INTEGER(0..255),
ms320 INTEGER(0..319),
ms512 INTEGER(0..511),
ms640 INTEGER(0..639),
ms1024 INTEGER(0..1023),
ms1280 INTEGER(0..1279),
ms2048 INTEGER(0..2047),
ms2560 INTEGER(0..2559),
ms5120 INTEGER(0..5119),
ms10240 INTEGER(0..10239)
},
...
}
```

Dynamic_Transmission_Timer field indicates a value in multiple integers of 1 ms. ms0 corresponds to 0, ms1 corresponds to 1 ms, ms2 corresponds to 2 ms, and so on. The terminal starts or restarts the timer when PDCCH indicating new transmission is received. This field indicates the length of Dynamic_Transmission_Timer for the primary DTX group. This field indicates the length of Dynamic_Transmission_Period of the primary DTX group.

DTX_Cycle_Offset field is defined as a CHOICE structure. The CHOICE structure is defined with 20 integer sets. Each integer set has different value range (ranges from zero to a specific maximum value). This field includes an integer and an information indicating from which integer set the integer is chosen. The integer is DTXStartOffset. Sum of the maximum value of the integer set and one is equal to DTXCycle. DTX_Cycle_Offset field indicates a DTXCycle and DTXStartOffset that are commonly applied to the primary DTX group and the secondary DTX group.

Static_Transmission_Timer field indicates a value in multiples of 1/32 ms (subMilliSeconds) or in ms (milliSecond). This field indicates the length of Static_Transmission_Timer/Static_Transmission_Period of the primary DTX group. This field indicates the length of Static_Transmission_Period of the primary DTX group.

DTX-ConfigSecondary includes configuration information for the secondary DTX group. This IE includes following fields.

Static_Transmission_Timer field indicates Static_Transmission_Timer value for secondary DTX group.

Dynamic_Transmission_Timer field indicates Dynamic_Transmission_Timer value for secondary DTX group.

DTX2-Config IE in DTX2-Config field

DTX2-Config IE in DTX2-Config field includes an information on additional periodicity and additional offset for the primary DTX group.

```
DTX2-Config ::= SEQUENCE {
   DTX_Cycle_Offset2 CHOICE {
ms16.7 INTEGER(0..16),
ms33.4 INTEGER(0..33),
ms50.1 INTEGER(0..50),
},
...
}
```

This IE includes DTX_Cycle_Offset2 field. The DTX_Cycle_Offset2 field in DTX2-Config field replaces DTX_Cycle_Offset field in DTX-Config field for the primary DTX group. The DTX_Cycle_Offset2 field in DTX2-Config field does not replace DTX_Cycle_Offset field in DTX-Config field for the secondary DTX group.

DTX_Cycle_Offset2 field is defined as another CHOICE structure with another plurality of integer sets. The base station includes in this field an integer and an information indicating from which integer set the integer is chosen. Each integer set is mapped with a specific non-integer value. The maximum value of the integer set is equal to the closest lower integer to the mapped non-integer value. The mapped non-integer value of the integer set from which the integer is chosen is DTXCycle. The integer itself is DTXStartOffset. DTX_Cycle_Offset2 field of DTX2-Config field indicates a DTXCycle and DTXStartOffset that are applied to the primary DTX group.

DTX2-Config IE in DTX2-ConfigSecondary field includes an information on additional periodicity and additional offset for the secondary DTX group.

The DTX_Cycle_Offset2 field in DTX2-ConfigSecondary field replaces DTX_Cycle_Offset field in DTX-Config field for the secondary DTX group. The DTX_Cycle_Offset2 field in DTX2-ConfigSecondary field does not replace DTX_Cycle_Offset field in DTX-Config field for the primary DTX group.

DTX_Cycle_Offset2 field in DTX2-ConfigSecondary field includes an integer and an information indicating from which integer set the integer is chosen from. DTX_Cycle_Offset2 field of DTX2-ConfigSecondary field indicates a DTXCycle and DTXStartOffset that are applied to the secondary DTX group.

Depending on presence/absence of DTX_Cycle_Offset2 field, DTXCycle and DTXStartOffset for each DTX group are determined as followings.

- If DTX_Cycle_Offset2 field is indicated for the primary DTX group (if DTX2-Config field is set to ‘setup’) and if DTX_Cycle_Offset2 field is indicated for the secondary DTX group (if DTX2-ConfigSecondary field is set to ‘setup’),
  - DTXCycle/DTXStartOffset for the primary DTX group are determined based on DTX_Cycle_Offset2 field in DTX2-Config field; and
  - DTXCycle/DTXStartOffset for the secondary DTX group are determined based on DTX_Cycle_Offset2 field in DTX2-ConfigSecondary field.
- If DTX_Cycle_Offset2 field is indicated for the primary DTX group (if DTX2-Config field is set to ‘setup’) and if DTX_Cycle_Offset2 field is not indicated for the secondary DTX group (if DTX2-ConfigSecondary field is set to ‘release’),
  - DTXCycle/DTXStartOffset for the primary DTX group are determined based on DTX_Cycle_Offset2 field in DTX2-Config field; and
  - DTXCycle/DTXStartOffset for the secondary DTX group are determined based on DTX_Cycle_Offset2 field in DTX2-Config field.
- If DTX_Cycle_Offset2 field is not indicated for the primary DTX group (if DTX2-Config field is set to ‘release’) and if DTX_Cycle_Offset2 field is indicated for the secondary DTX group (if DTX2-ConfigSecondary field is set to ‘setup’),
  - DTXCycle/DTXStartOffset for the primary DTX group are determined based on DTX_Cycle_Offset field in DTX-Config field.
  - DTXCycle/DTXStartOffset for the secondary DTX group are determined based on DTX_Cycle_Offset2 field in DTX2-ConfigSecondary field; and
- If DTX_Cycle_Offset2 field is not indicated for the primary DTX group (if DTX2-Config field is set to ‘release’) and if DTX_Cycle_Offset2 field is not indicated for the secondary DTX group (if DTX2-Config-Secondary field is set to ‘release’),
  - DTXCycle/DTXStartOffset for the primary DTX group are determined based on DTX_Cycle_Offset field in DTX-Config field.
  - DTXCycle/DTXStartOffset for the secondary DTX group are determined based on DTX_Cycle_Offset field in DTX-Config field.

DTX3-Config IE for primary DTX group is included in DTX3-Config field.

DTX3-Config IE in DTX3-Config field provides additional DTX parameters for the primary DTX group.

```
DTX3-Config ::= SEQUENCE {
   Static_Transmission_Period_Determination_2     ENUMERATED
{true} OPTIONAL,
   BigFrameNumber     INTEGER(0..1023)          OPTIONAL,
   ReferenceFrameNumber1 ENUMERATED {512}     OPTIONAL,
   ReferenceFrameNumber2 INTEGER(0..1023)       OPTIONAL,
 ...
 }
```

DTX3-Config IE is to provide the configuration information related to Static_Transmission_Period_Determination_mode_2.

Static_Transmission_Period_Determination_2 field is an optional field.

- If this field is present, the terminal determines the starting subframe of Static_Transmission_Timer based on Static_Transmission_Period_Determination_mode_2.
- If this field is absent, the terminal determines the starting subframe of Static_Transmission_Timer based on Static_Transmission_Period_Determination_mode_1.

BigFrameNumber is an optional field. This field is related to second_counter. This field is absent if Static_Transmission_Period_Determination_2 field is absent.

- If Static_Transmission_Period_Determination_2 field is present and BigFrameNumber is absent, the terminal initializes the second_counter to zero. Alternatively, the terminal initializes the second_counter to one.
- If Static_Transmission_Period_Determination_2 field is present and BigFrameNumber is present, the terminal initializes the second_counter to the value indicated in BigFrameNumber field.

ReferenceFrameNumber1 field is an optional field. This field is absent if Static_Transmission_Period_Determination_2 field is absent. To determines the starting subframe of Static_Transmission_Timer, the terminal uses the closest SFN as the DTX-timeReferenceSFN preceding the reception of the DTX3-Config.

If Static_Transmission_Period_Determination_2 field is present and ReferenceFrameNumber1 field is absent, the terminal uses SFN 0 as DTX-timeReferenceSFN.

If Static_Transmission_Period_Determination_2 field is present and ReferenceFrameNumber1 field is present, the terminal uses SFN 512 as DTX-timeReferenceSFN.

ReferenceFrameNumber2 field is an optional field. This field is absent if Static_Transmission_Period_Determination_2 field is absent. With regards to determination of the starting subframe for Static_Transmission_Timer, the terminal updates the second_counter based on a first SFN and the value indicated in ReferenceFrameNumber1 field. The first SFN is the SFN when DTX3-Config is received.

If Static_Transmission_Period_Determination_2 field is present and ReferenceFrameNumber2 field is absent, the terminal does not update the second_counter.

If Static_Transmission_Period_Determination_2 field is present and ReferenceFrameNumber2 field is present, the terminal updates the second_counter. Static_Transmission_Period_Determination_2 field being present is equivalent to starting subframe of Static_Transmission_Timer being determined based on Static_Transmission_Period_Determination_mode_2.

Static_Transmission_Period_Determination_2 field being absent is equivalent to starting subframe of Static_Transmission_Timer being determined based on Static_Transmission_Period_Determination_mode_1.

DTX3-Config IE for secondary DTX group is included in DTX3-ConfigSecondaryGroup field.

Depending on presence/absence of Static_Transmission_Period_Determination_2 field, the terminal determines how to determine the starting subframe of Static_Transmission_Timer for each DTX group.

In a first embodiment, the starting subframe of Static_Transmission_Timer for primary DTX group and the starting subframe of Static_Transmission_Timer for secondary DTX group are determined based on separate IEs.

If Static_Transmission_Period_Determination_2 field is absent in DTX3-Config IE and Static_Transmission_Period_Determination_2 field is present in DTX3-ConfigSecondaryGroup IE, The terminal determines to use Static_Transmission_Period_Determination_mode_1 for the primary DTX group and Static_Transmission_Period_Determination_mode_2 for the secondary DTX group.

If Static_Transmission_Period_Determination_2 field is present in DTX3-Config IE and Static_Transmission_Period_Determination_2 field is absent in DTX3-ConfigSecondaryGroup IE, The terminal determines to use Static_Transmission_Period_Determination_mode_2 for the primary DTX group and Static_Transmission_Period_Determination_mode_1 for the secondary DTX group.

In a second embodiment, the starting subframe of Static_Transmission_Timer for primary DTX group and the starting subframe of Static_Transmission_Timer for secondary DTX group are determined based on a single IE (Static_Transmission_Period_Determination_2 in DTX3-Config IE).

If Static_Transmission_Period_Determination_2 field is absent in DTX3-Config IE, the terminal determines to use Static_Transmission_Period_Determination_mode_1 for the primary DTX group and Static_Transmission_Period_Determination_mode_1 for the secondary DTX group.

If Static_Transmission_Period_Determination_2 field is present in DTX3-Config IE, the terminal determines to use Static_Transmission_Period_Determination_mode_2 for the primary DTX group and Static_Transmission_Period_Determination_mode_2 for the secondary DTX group.

In a third embodiment, the starting subframe of Static_Transmission_Timer for primary DTX group and the starting subframe of Static_Transmission_Timer for secondary DTX group are determined based on a single IE or separate IEs.

If Static_Transmission_Period_Determination_2 field is absent in DTX3-Config IE, The terminal determines to use Static_Transmission_Period_Determination_mode_1 for the primary DTX group.

If Static_Transmission_Period_Determination_2 field is present in DTX3-Config IE, The terminal determines to use Static_Transmission_Period_Determination_mode_2 for the primary DTX group.

If Static_Transmission_Period_Determination_2 field is absent in DTX3-Config IE and Static_Transmission_Period_Determination_2 field is absent in DTX3-ConfigSecondaryGroup IE, The terminal determines to use Static_Transmission_Period_Determination_mode_1 for the secondary DTX group.

If Static_Transmission_Period_Determination_2 field is absent in DTX3-Config IE and Static_Transmission_Period_Determination_2 field is present in DTX3-ConfigSecondaryGroup IE, The terminal determines to use Static_Transmission_Period_Determination_mode_2 for the secondary DTX group.

If Static_Transmission_Period_Determination_2 field is present in DTX3-Config IE and Static_Transmission_Period_Determination_2 field is absent in DTX3-ConfigSecondaryGroup IE, The terminal determines to use Static_Transmission_Period_Determination_mode_2 for the secondary DTX group.

To save signaling overhead, parameters for Static_Transmission_Period_Determination_mode_2 can be shared between primary DTX group and secondary DTX group.

BigFrameNumber field is provided either in a DTX3-Config or in DTX3-ConfigSecondaryGroup.

If BigFrameNumber field is present in a DTX3-Config and if Static_Transmission_Period_Determination_mode_2 is configured both to the primary DTX group and to the secondary DTX group, The terminal applies the value indicated in BigFrameNumber field both to the primary DTX group and the secondary DTX group.

If BigFrameNumber field is present in a DTX3-Config-Secondary and if Static_Transmission_Period_Determination_mode_2 is configured only to the secondary DTX group, The terminal applies the value indicated in the BigFrameNumber field to the secondary DTX group.

If BigFrameNumber field is present neither in a DTX3-Config nor in DTX3-ConfigSecondary and if Static_Transmission_Period_Determination_mode_2 is configured both to the primary DTX group and the secondary DTX group, The terminal applies zero both to the primary DTX group and to the secondary DTX group.

That the starting subframe of Static_Transmission_Timer is determined based on Static_Transmission_Period_Determination_mode_1 means that the starting subframe of Static_Transmission_Timer is determined based on DTX_Cycle_Offset field in DTX-Config and first_counter and subframe number.

That the starting subframe of Static_Transmission_Timer is determined based on Static_Transmission_Period_Determination_mode_2 means that the starting subframe of Static_Transmission_Timer is determined based on DTX_Cycle_Offset2 field in DTX2-Config (or in DTX2-ConfigSecondary) and second_counter and first_counter and subframe number.

In another embodiment, that the starting subframe of Static_Transmission_Timer is determined based on Static_Transmission_Period_Determination_mode_2 means that the starting subframe of Static_Transmission_Timer is determined based on DTX_Cycle_Offset2 field in DTX2-Config (or in DTX2-ConfigSecondary) and ReferenceFrameNumber2 in DTX3-Config (or in DTX3-ConfigSecondaryGroup).

```
[DTX4-Config]
DTX4-Config IE in dtx4-Config field provides DTX parameters related
to Restricted_Transmission_Period_2.
DTX4-Config ::=     SEQUENCE {
  Length ENUMERATED {ms1, ms3, ms4,... },
DTX_Cycle_Offset          CHOICE {
ms10 INTEGER(0..9),
ms20 INTEGER(0..19),
}
  ...,
  Allowed_Configured_Grant_List            SEQUENCE (SIZE (1..n))
OF Configured_Grant_Index    OPTIONAL, -- Need R
  Allowed_DRB_List                SEQUENCE (SIZE (1..m)) OF
drb-Identifier
  OPTIONAL, -- Need R
  CGI_PUCCH_Allowed               Enumerated {allowed}
OPTIONAL
...
}
```

Length field indicates the length of Restricted_Transmission_Period_2 in ms (or in number of subframes).

Allowed_Configured_Grant_List field comprises one or more configured_grant_configuration_index. This field indicates which configured grants are allowed to be transmitted in Restricted_Transmission_Period_2. Terminal performs uplink transmission for the configured grants indicated in Allowed_Configured_Grant_List during Restricted_Transmission_Period_2.

Allowed_DRB_List field comprises one or more DRB identifiers. This field indicates PDU_SETs from which DRBs are allowed to be transmitted in Restricted_Transmission_Period_2. Terminal performs uplink transmission for the configured grant associated with the DRBs indicated in Allowed_DRB_List during Restricted_Transmission_Period_2. This field can further indicates QoS flows that can be transmitted during Restricted_Transmission_Period_2.

If neither Allowed_Configured_Grant_List nor Allowed_DRB_List field are present in DTX4-Config, terminal consider uplink transmission for configured grant is not allowed during Restricted_Transmission_Period_2. In this case, the terminal does not perform PUSCH transmission for configured grant during Restricted_Transmission_Period_2.

CGI_PUCCH_Allowed indicates whether CGI on PUCCH is allowed for transmission during Restricted_Transmission_Period_2. If this field is present in DTX4-Config, the terminal performs CGI transmission on PUCCH during Restricted_Transmission_Period_2.

CGI transmission on PUSCH is allowed during Restricted_Transmission_Period_2. The terminal performs CGI transmission on PUSCH during Restricted_Transmission_Period_2.

DTX5-Config IE in dtx5-Config field provides DTX parameters related to Restricted_Transmission_Period_3.

```
DTX5-Config ::=             SEQUENCE {
Length            ENUMERATED {ms1, ms3, ms4, },
DTX_Cycle_Offset                  CHOICE {
ms10 INTEGER(0..9),
ms20 INTEGER(0..19),
}
  ...,
  CGI_PUSCH_Allowed                    Enumerated {allowed}
OPTIONAL
...
}
```

CGI_PUSCH_Allowed indicates whether CGI on PUSCH is allowed during Restricted_Transmission_Period_2. If this field is present in DTX5-Config, the terminal performs CGI transmission on PUSCH during Restricted_Transmission_Period_3.

CGI transmission on PUCCH is allowed during Restricted_Transmission_Period_3. The terminal performs CGI transmission on PUCCH during Restricted_Transmission_Period_3.

PUSCH transmission during Restricted_Transmission_Period_3 is allowed. Terminal performs uplink transmission for configured uplink grants during Restricted_Transmission_Period_3.

The RRCReconfiguration can include one or more configured grant configurations for each UL BWP.

```
RRCReconfiguration
  uplinkBWP-config                           SEQUENCE {
    configuredGrantConfigToAddMod SEQUENCE (SIZE (1..x)) OF
ConfiguredGrantConfig               OPTIONAL,
  ...
  }
```

A ConfiguredGrantConfig comprises a configured_grant_base_configurations and one or more configured_grant_additional_configurations.

The configured_grantbased_configuration indicates the frequency domain resource and time domain resource and other transmission parameters.

The configured_grant_additional_configuration indicates time domain resource. A set of configured grants are configured based on a configured_grant_base_configuration and a configured_grant_additional_configuration. A configured_grant_base_configuration in a ConfiguredGrantConfig is common to one or more configured_grant_additional_configurations included in the corresponding ConfiguredGrantConfig.

configured_grantbase_configuration includes following fields.

Allowed_DRB_List: This field indicates data from which DRBs are allowed to be transmitted on PUSCH scheduled by the configured grants configured by the ConfiguredGrantConfig. This flield can further indicates QoS flows for the configured grants configured by the ConfiguredGrantConfig.

HARQ_PID_Determination_2: This field indicates whether the terminal applies HARQ_PID_Determinal_2 in determining HARQ process ID. If this field is absent, the terminal applies HARQ_PID_Determinal_1.

MCS_table_information. This field indicates which MCS table is used for the configured grant.

DMRS_configuration. This field indicates DMRS configuration of the configured grant . . . .

configured_grant_configuration_index. This field indicates the index of the configured grant configuration.

number_of_HARQ_Processes: This field indicates the number of HARQ processes for this configured grant.

HARQ_Process_ID_offset. This field configures the range of HARQ process ID which can be used for this configured grant. Terminal selects a HARQ ID within [HARQ_Process_ID_offset, . . . , (HARQ_Process_ID_offset+number_of_HARQ_Processes−1)]

Frequency_Domain_Resource_Information. This field is a bit map and indicates which frequency domain resource is allocated to the configured grant.

Time_Domain_Resource_Information. This field indicates time pattern of the configured grant.

Periodicity_configured_grant: This field indicates periodicity of the configured grant in the number of symbols of the uplink bandwidth part.

time_domain_offset: This field indicates time domain offset of the configured grant in the number of slots of the uplink bandwidth part.

time_domain_allocation: This field indicates a combination of start symbol and length and PUSCH mapping type.

Each of one or more configured_grant_additional_configuration includes following fields.

configured_grant_configuration_index_2.

HARQ_Process_ID_offset.

Time_Domain_Resource_Information_part_1

Periodicity_configured_grant.

time_domain_offset configured_grant_base_configuration_index. This field indicates the configured grant base configuration to which this configured grant refers to.

For configured grant associated with a configured_grant_base_configuration, the terminal determines the configuration of the configured grant based on the configured_grant_base_configuration.

For configured grant associated with a configured_grant_additional_configuration, the terminal determines the configuration of the configured grant based on the configured_grant_additional_configuration and a configured_grantbase_configuration. The configured_grantbase_configuration is indicated by the configured_grant_base_configuration_index in the configured_grant_additional_configuration.

A field_set_1 is indicated in a configured_grant_additional_configuration and applied only to the configured grants of the configured_grant_additional_configuration. The field_set_1 includes HARQ_Process_ID_offset and Periodicity_configured_grant and time_domain_offset.

A field_set_2 is indicated in a configured_grant_base_configuration and applied to configured grants of a one or more configured_grant_base_configuration. The field_set_2 includes MCS_table_information and DMRS_configuration and number_of_HARQ_Processes and Frequency_Domain_Resource_Information and time_domain_allocation and Second_Frame_Number_Indicator.

The RRCReconfiguration can include one or more CGI configurations. Each of the one or more CGI configuration is per UL BWP (specific to an UL BWP).

Terminal transmits CGI at a specific point of time on a specific radio resource with a specific format based on CGI configuration of the currently active uplink bandwidth part.

Each of CGI configuration comprises following fields.

```
CGI_Config ::= SEQUENCE {
cgi_Resource CHOICE {
cgi_PUCCH PUCCH_Resource_Id,
cgi_PUSCH PUSCH_Resource_Id
  },
associated_ServingCellIndexServingCellIndex
associated_CGIndex SEQUENCE   (SIZE   (1..k))   OF
configured_grant_configuration_index,
time_Pattern_Info   Time_Pattern_CGI
}
```

Configured Grant Indication (CGI) is transmitted in frequency domain indicated by cgi_Resource field.

If the cgi_Resource_field includes PUCCH_Resource_Id, CGI transmission is performed in PUCCH indicated by PUCCH_Resrouce_Id.

If the cgi_Resource_field includes PUSCH_Resource_Id, CGI transmission is performed in PUSCH indicated by PUSCH_Resrouce_Id.

associated_ServingCellIndex field indicates the serving cell for which the configured grants are configured Associated CGIndex field indicates configured grants reported in the CGI. The first configured_grant_configuration_index corresponds to the first bit of the CGI, the second configured_grant_configuration_index corresponds to the second bit of the CGI and so on.

Time_Pattern_CGI IE comprises an first parameter and a second parameter. The first parameter indicates a first CGI slot. The second parameter indicates the periodicity of the CGI slots.

Terminal transmits CGI in the PUCCH/PUSCH resource which is indicated by PUCCH/PUSCH resource id and is closest to the CGI slot.

In 2A-31, the terminal and the base station performs DTX operation and configured grant transmission and data status reporting based on the configuration information indicated in the RRCReconfiguration.

The terminal determines whether to use Static_Transmission_Period_Determination_mode_1 or Static_Transmission_Period_Determination_mode_2 for the primary DTX group and the secondary DTX group.

In a first embodiment, the terminal performs determination based on presence/absence of Static_Transmission_Period_Determination_2 field.

If Static_Transmission_Period_Determination_2 field is not indicated for the primary DTX group (if Static_Transmission_Period_Determination_2 field is absent in DTX3-Config), the terminal applies Static_Transmission_Period_Determination_mode_1 for the primary DTX group.

If Static_Transmission_Period_Determination_2 field is indicated for the primary DTX group (if Static_Transmission_Period_Determination_2 field is present in DTX3-Config), the terminal applies Static_Transmission_Period_Determination_mode_2 for the primary DTX group.

If Static_Transmission_Period_Determination_2 field is not indicated for the secondary DTX group (if Static_Transmission_Period_Determination_2 field is absent in DTX3-ConfigSecondaryGroup), the terminal applies Static_Transmission_Period_Determination_mode_1 for the secondary DTX group.

If Static_Transmission_Period_Determination_2 field is indicated for the secondary DTX group (if Static_Transmission_Period_Determination_2 field is present in DTX3-ConfigSecondaryGroup), the terminal applies Static_Transmission_Period_Determination_mode_2 for the secondary DTX group.

In a second embodiment, to reduce the signaling overhead, the terminal performs determination based on configured periodicity.

If an integer value is configured for long DTX cycle of the primary DTX group (DTX_Cycle_Offset2 field is absent in DTX2-Config IE; or DTX2-Config IE is absent in MAC-CellGroupConfig IE), the terminal applies Static_Transmission_Period_Determination_mode_1 for the primary DTX group.

If a non-integer value is configured for long DTX cycle of the primary DTX group (DTX_Cycle_Offset2 field is present in DTX2-Config IE), the terminal applies Static_Transmission_Period_Determination_mode_2 for the primary DTX group.

If an integer value is configured for long DTX cycle of the secondary DTX group (DTX_Cycle_Offset2 field is absent in DTX2-ConfigSecondary IE; or DTX2-ConfigSecondary IE is absent in MAC-CellGroupConfig IE), the terminal applies Static_Transmission_Period_Determination_mode_1 for the secondary DTX group.

If a non-integer value is configured for long DTX cycle of the secondary DTX group (DTX_Cycle_Offset2 field is present in DTX2-ConfigSecondary IE), the terminal applies Static_Transmission_Period_Determination_mode_2 for the secondary DTX group.

In a third embodiment, to achieve the signaling overhead reduction and to overcome the limitation of the second embodiment, the terminal performs determination based on the periodicity and the presence/absence of Static_Transmission_Period_Determination_2 field. The limitation of the second embodiment is that if an integer value of non divisor of is configured for DTX cycle, different outcome is produced for Static_Transmission_Period_Determination_model_1 and Static_Transmission_Period_Determination_mode_2 after SFN wraparound.

If a first integer value is configured for long DTX cycle of the primary DTX group (DTX_Cycle_Offset2 field is absent in DTX2-Config IE and DTX_Cycle_Offset field in DTX-Config indicates a first integer value for DTX_Cycle), The terminal applies Static_Transmission_Period_Determination_mode_1 for the primary DTX group.

If a second integer value is configured for long DTX cycle of the primary DTX group (DTX_Cycle_Offset2 field is absent in DTX2-Config IE and DTX_Cycle_Offset field in DTX-Config indicates a second integer value for DTX_Cycle) and If Static_Transmission_Period_Determination_2 field is not configured for the primary DTX group, The terminal applies Static_Transmission_Period_Determination_mode_1 for the primary DTX group.

If a second integer value is configured for long DTX cycle of the primary DTX group (DTX_Cycle_Offset2 field is absent in DTX2-Config IE and DTX_Cycle_Offset field in DTX-Config indicates a second integer value for DTX_Cycle) and If Static_Transmission_Period_Determination_2 field is configured for the primary DTX group (Static_Transmission_Period_Determination_2 field is present in DTX2-Config), The terminal applies Static_Transmission_Period_Determination_mode_2 for the primary DTX group.

If a first integer value is configured for long DTX cycle of the secondary DTX group (DTX_Cycle_Offset2 field is absent in DTX2-ConfigSecondary IE and DTX_Cycle_Offset field in DTX-Config indicates a first integer value for DTX_Cycle), The terminal applies Static_Transmission_Period_Determination_mode_1 for the secondary DTX group.

If a second integer value is configured for long DTX cycle of the secondary DTX group (DTX_Cycle_Offset2 field is absent in DTX2-ConfigSecondary IE and DTX_Cycle_Offset field in DTX-Config indicates a second integer value for DTX_Cycle) and If Static_Transmission_Period_Determination_2 field is not configured for the secondary DTX group, The terminal applies Static_Transmission_Period_Determination_mode_1 for the secondary DTX group.

If a second integer value is configured for long DTX cycle of the secondary DTX group (DTX_Cycle_Offset2 field is absent in DTX2-ConfigSecondary IE and DTX_Cycle_Offset field in DTX-Config indicates a second integer value for DTX_Cycle) and If Static_Transmission_Period_Determination_2 field is configured for the secondary DTX group (Static_Transmission_Period_Determination_2 field is present in DTX2-ConfigSecondary), The terminal applies Static_Transmission_Period_Determination_mode_2 for the secondary DTX group.

The first integer value is divisor of 10240 (i.e. 10, 20, 32, 40, 64, 80, 128, 160, 256, 320, 512, 640, 1024, 1280, 2048, 2560, 5120 or 10240). The second integer value is not divisor of 10240 (i.e. 60 or 70).

The terminal determines whether to use HARQ_PID_Determination_1 or HARQ_PID_Determination_2 for each configured grant.

If HARQ_PID_Determination_2 is absent in a configured_grant_base_configuration, the terminal applies HARQ_PID_Determination_mode_1 for configured grants. The configured grants are the grants configured by the configured_grant_base_configuration and associated configured_grant_additional_configurations.

If HARQ_PID_Determination_2 is present in a configured_grant_base_configuration, the terminal applies HARQ_PID_Determination_mode_2 for configured grants. The configured grants are the grants configured by the configured_grant_base_configuration and associated configured_grant_additional_configurations.

HARQ_PID_Determination_mode_1

The terminal determines the HARQ Process ID associated with the first symbol of a UL transmission based on the following equation $$HARQ\ \text{Process}\ ID = [\text{floor}(\text{CURRENT\_symbol/periodicity})]\ \text{modulo}\ nrofHARQ\text{–Processes} + harq\text{–}ProcID\text{–Offset2, and}$$

CURRENT_symbol=(First_counterx numberOfSlotsPerFrame×numberOfSymbolsPerSlot+slot number in the frame×numberOfSymbolsPerSlot+symbol number in the slot)

The terminal determines the HARQ Process ID associated with the first symbol of a UL transmission based on the following equation $$HARQ\ \text{Process}\ ID = [\text{floor}(\text{CURRENT\_symbol/periodicity})]\ \text{modulo}\ nrofHARQ\text{–Processes} + harq\text{–}ProcID\text{–Offset2, and}$$

CURRENT_symbol=(third_counter×firrst_count×numberOfSlotsPerFrame×numberOfSymbolsPerSlot+slot number in the frame×numberOfSymbolsPerSlot+symbol number in the slot)

During the DTX operation, the terminal starts Static_Transmission_Timer at a specific slot of a specific subframe of a specific frame of a specific big frame.

If Static_Transmission_Period_Determination_mode_1 is applied, the specific subframe and the specific frame are determined based on the following equation.

$$[(\text{first\_counter} \times 10 + \text{subframe number}]\ \text{modulo}\ (DTXCycle) = DTXStartOffset$$

For both the primary DTX group and the secondary DTX group, first_counter is initialized to the frame_number when the terminal receives the system information. first_counter is incremented by one every radio frame.

subframe number is the number of subframe starting from 0.

The specific frame is determined from the first_counter fulfilling the equation, the specific subframe is determined from the subframe number fulfilling the equation.

For the primary DTX group, DTXCycle and DTXStartOffset are determined from DTX_Cycle_Offset field in the DTX-Config.

For the secondary DTX group, DTXCycle and DTX_Cycle_Offset are determined from DTX_Cycle_Offset field in the DTX-Config.

If Static_Transmission_Period_Determination_mode_2 is applied, the specific subframe and the specific frame and specific big frame are determined based on the following equation.

$$[\text{second\_counter} * 10240 + (\text{first\_counter} \times 10) + \text{subframe number}]\ \text{modulo}\ (DTXCycle) = DTXStartOffset$$

The specific frame is determined from the first_counter and the second_counter that fulfil the equation. The specific subframe is determined from the subframe number fulfilling the equation.

For both the primary DTX group and the secondary DTX group, the second_counter is initialized to the BigFrameNumber when the terminal receives a RRCReconfiguration. The second_counter is incremented by one when first_counter wrap around to zero. A single second_counter is used both for the primary DTX group and for the secondary DTX group.

For the primary DTX group, DTXCycle and DTXStartOffset are determined from DTX_Cycle_Offset2 field in the DTX2-Config.

For the secondary DTX group, DTXCycle and DTXStartOffset are determined from DTX_Cycle_Offset2 field in the DTX2-ConfigSecondary.

In an alternative embodiment, if Static_Transmission_Period_Determination_mode_2 is applied, the terminal starts Static_Transmission_Timer at a first subframe. The terminal determines a Nth first subframe occurs in the subframe fulfilling the following equation.

$$[(\text{first\_counter} \times 10) + \text{subframe number}] = (DTXReferenceFranmeNumber \times 10 + DTXStartOffset + N \times DTXCycle)\text{modulo } (10240)$$

For the primary DTX group, DTXCycle and DTXStartOffset are determined from DTX_Cycle_Offset2 field in the DTX2-Config.

For the secondary DTX group, DTXCycle and DTXStartOffset are determined from DTX_Cycle_Offset2 field in the DTX2-ConfigSecondary.

During DTX operation, the terminal starts Static_Transmission_Timer for a DTX group at a subframe. The terminal starts or restarts Dynamic_Transmission_Timer for a DTX group if PDCCH indicating new transmission is received on any serving cell of the DTX group during Static_Transmission_Period.

Static_Transmission_Period of a primary DTX group is the time period during when Static_Transmission_Timer for the primary DTX group is running. Static_Transmission_Period of a secondary DTX group is the time period during when Static_Transmission_Timer for the secondary DTX group is running. The length of Static_Transmission_Period is static. Static_Transmission_Period occurs periodically.

Dynamic_Transmission_Period of a primary DTX group is the time period during when Dynamic_Transmission_Timer for the primary DTX group is running and Static_Transmission_Timer for the primary DTX group is not running. Static_Transmission_Period of a secondary DTX group is the time period during when Dynamic_Transmission_Timer for the secondary DTX group is running and Static_Transmission_Timer for the secondary DTX group is not running. The length of Dynamic_Transmission_Period is dynamic. Dynamic_Transmission_Period occurs aperiodically.

Restricted_Transmission_Period_2 is the time period occurring periodically. The length of Restricted_Transmission_Period_2 is static. Restricted_Transmission_Period_2 is common to the primary DTX group and the secondary DTX group.

Restricted_Transmission_Period_3 is the time period occurring periodically. The length of Restricted_Transmission_Period_3 is static. Restricted_Transmission_Period_3 is common to the primary DTX group and the secondary DTX group.

Terminal performs uplink transmission for a first set of uplink signals in the primary DTX group during Static_Transmission_Period of the primary DTX group.

Terminal performs uplink transmission for a first set of uplink signals in the secondary DTX group during Static_Transmission_Period of the secondary DTX group.

Terminal performs uplink transmission for a second set of uplink signals in the primary DTX group during Dynamic_Transmission_Period of the primary DTX group.

Terminal performs uplink transmission for a second set of uplink signals in the secondary DTX group during Dynamic_Transmission_Period of the secondary DTX group.

Terminal performs uplink transmission for a third set of uplink signals in the primary DTX group and in the secondary DTX group during Restricted_Transmission_Period_2.

Terminal performs uplink transmission for a fourth set of uplink signals in the primary DTX group and in the secondary DTX group during Restricted_Transmission_Period_3.

Terminal performs uplink transmission for a fifth set of uplink signals in the primary DTX group during RTP of the primary DTX group.

Terminal performs uplink transmission for a fifth set of uplink signals in the secondary DTX group during RTP of the secondary DTX group.

The terminal performs configured grant transmission based on the configuration information included in the RRCReconfiguration If HARQ_PID_Determination_mode_2 is applied, the terminal applies BigFrameNumber and ReferenceFrameNumber2 in DTX3-Config IE to manage third_counter. Third_count is second_counter plus one. Or third_counter is initialized to one and the second_counter is initialized to zero. Alternatively, the second_counter is initialized to one. The second_counter is used both for Static_Transmission_Period and HARQ PID.

For each PDU_SET_arrival_cycle, the terminal determines which configured grants are to be used and which configured grants are to be unused.

At each CGI PUCCH occasion immediately before a PDU_SET_arrival_cycle, the terminal transmits CGI on a specific PUCCH resource. CGI PUCCH occasion is the slot where CGI on PUCCH is transmitted.

If the CGI PUCCH occasion partially or fully overlaps with Static_Transmission_Period of the primary DTX group, the terminal transmits CGI on PUCCH during Static_Transmission_Period of the primary DTX group.

If the CGI PUCCH occasion partially or fully overlaps with Dynamic_Transmission_Period of the primary DTX group, the terminal transmits CGI on PUCCH during Dynamic_Transmission_Period of the primary DTX group.

If the CGI PUCCH occasion partially or fully overlaps with Restricted_Transmission_Period_1 of the primary DTX group, the terminal transmits CGI on PUCCH during Restricted_Transmission_Period_1 of the primary DTX group.

If the CGI PUCCH occasion partially or fully overlaps with Restricted_Transmission_Period_2, the terminal transmits CGI on PUCCH during Restricted_Transmission_Period_2.

If the CGI PUCCH occasion partially or fully overlaps with Restricted_Transmission_Period_3, the terminal transmits CGI on PUCCH during Restricted_Transmission_Period_3 if CGI_PUSCH is present in DTX4-Config.

CGI comprises with one or more bits. Terminal determines the bit width of CGI based on the number of configured_grant_additional_configurations of an uplink bandwidth part. The uplink bandwidth part is the bandwidth part with most configured_grant_additional_configurations. The bit width of CGI is derived from the log 2 operation. For example, if 2 configured_grant_additonal_configurations are configured for UL BWP 1 and 5 for UL BWP 2, and if currently active UL BWP is UL BWP 1, terminal determines the bit width based on the number of configured_grant_additinoal_configuration of BWP 2 (not based on that of currently active UL BWP). The bit width (i.e., the number of bits) of CGI is 3 in this case.

The first bit of CGI corresponds to a configured grant in the currently active BWP of a specific serving cell. The corresponding configured grant is the configured grant associated with configured_grant_index2 of 0.

The second bit of CGI corresponds to a configured grant in the currently active BWP of a specific serving cell. The corresponding configured grant is the configured grant associated with configured_grant_index2 of 1. The specific serving cell is indicated in the CGI configuration.

If a bit has no corresponding configured_grant_additional_configuration in the currently active BWP, terminal sets the bit to a predefined value.

If the bit is set to a first value, the corresponding configured_grant_additional_configuration are to be used by the terminal in the corresponding PDU_SET_arrival_cycle (or until the next CGI PUCCH occasion).

If the bit is set to a second value, the corresponding configured_grant_additional_configuration are to be unused by the terminal in the corresponding PDU_SET_arrival_cycle (or until the next CGI PUCCH occasion).

The base station can assign to other terminals the resources unused by the terminal.

The terminal performs data status reporting as explained in the FIG. 1D.

At some point of time, the base station determines to perform handover for the terminal to the second cell. The base station determines the configuration of the terminal in the second cell. The base station generates a third RRCReconfiguration message for handover towards the second cell.

In 2A-36, the base station transmits a third RRCReconfiguration to the terminal.

The third RRCReconfiguration includes the target cell information and DTX information and logical channel group configurations and buffer status report configurations to be applied by the terminal in the target cell.

The terminal cancels all BSRs and all DRs that have been triggered based on the configuration information in the source cell.

The terminal triggers a BSR and a DR according to the new configuration information for the target cell.

- If the third RRCReconfiguration includes no LogicalChannelGroupConfig,
  - the terminal considers DR is disabled in the target cell. The terminal does not trigger DR in the target cell.
- If the third RRCReconfiguration does not include LogicalChannelGroupConfig for a first logical channel group but includes for a second logical channel group,
  - the terminal considers SHORT_LCG is not configured for the first logical channel group. The first logical channel group does not trigger DR. The data in the logical channel group is not reported in DR.
  - the terminal considers SHORT_LCG is configured for the second logical channel group. The terminal triggers DR for the second logical channel group based on the new LogicalChannelGroupConfig for the second logical channel group.

In 2A-41, the terminal transmits RRCReconfigurationComplete in the second cell in response to the third RRCReconfiguration. The terminal transmits the triggered BSR together with the RRCReconfigurationComplete in a MAC PDU.

The terminal may transmit the triggered DR after RRCReconfigurationComplete message is successfully transmitted. The terminal may trigger BSR before completion of handover and trigger DR after completion of handover. The reason is as following. BSR should be triggered before completion of handover because BSR triggers random access procedure in the target cell for RRCReconfigurationComplete message transmission. To ensure quick transmission of RRCReconfigurationComplete, DR is triggered after successful completion of handover.

In 2A-46, the terminal receives a system information in the second cell. The system information includes frame_number field.

In 2A-51, the terminal and the base station perform DTX operation in the second cell.

DTX Parameters to be Applied in the Target Cell

The terminal and the base station determine the DTX parameters to be applied to the primary DTX group after handover as below.

- If the third RRCReconfiguration includes DTX-Config field and DTX_Cycle_Offset2 field in DTX2-Config and Static_Transmission_Period_Determination_2 field in DTX3-Config,
  - Terminal applies Static_Transmission_Period_Determination_mode_2 based on that Static_Transmission_Period_Determination_2 field is present in the third RRCReconfiguration; and
  - Terminal applies DTX_Cycle_Offset2 field in the third RRCReconfiguration.
- If the third RRCReconfiguration includes neither DTX-Config field nor DTX_Cycle_Offset2 field in DTX2-Config and if the third RRCReconfiguration includes Static_Transmission_Period_Determination_2 field in DTX3-Config,
  - Terminal applies Static_Transmission_Period_Determination_mode_2 based on that Static_Transmission_Period_Determination_2 field is present in the third RRCReconfiguration; and
  - Terminal applies DTX_Cycle_Offset2 field in the second RRCReconfiguration.
- If the third RRCReconfiguration does not include DTX-Config field and if the third RRCReconfiguration includes DTX2-Config set to 'release' and if the third RRCReconfiguration includes Static_Transmission_Period_Determination_2 field in DTX3-Config,
  - Terminal applies Static_Transmission_Period_Determination_mode_2 based on that Static_Transmission_Period_Determination_2 field is present in the third RRCReconfiguration.
  - Terminal applies DTX_Cycle_Offset field in the second RRCReconfiguration.
- If the third RRCReconfiguration does not include DTX-Config field and if the third RRCReconfiguration includes DTX2-Config set to 'release' and if the third RRCReconfiguration does not include Static_Transmission_Period_Determination_2 field in DTX3-Config,
  - Terminal applies Static_Transmission_Period_Determination_mode_1 based on that Static_Transmission_Period_Determination_2 field is absent in the third RRCReconfiguration.
  - Terminal applies DTX_Cycle_Offset field in the second RRCReconfiguration.

In short, the terminal applies, for DTX operation in the target cell, the DTX_Cycle_Offset2 that have been received (applied/used) in the old cell, if the RRC message instructing handover towards the target cell does not include the DTX_Cycle_Offset2. However, the terminal does not apply, for the DTX operation in the target cell, Static_Transmission_Period_Determination_2 that have been received (applied) in the old cell, even if the RRC message instructing handover towards the target cell does not include Static_Transmission_Period_Determination_2.

The reason why DTX_Cycle_Offset2 and Static_Transmission_Period_Determination_2 are handled differently is signaling efficiency. Since DTX_Cycle_Offset2 field is multi-bit information and Static_Transmission_Period_Determination_2 field is single bit information, signaling overhead reduction is achieved by reusing the stored value in case of DTX_Cycle_Offset2 field. However, for single bit information, reusing the stored value incur more overhead in case of releasing the value.

If the RRC message for handover from the first cell to the second cell include neither the first DTX parameter nor the second DTX parameter,

- The terminal applies in the second cell the first DTX parameter applied in the first cell and
- The terminal applies in the second cell the second DTX parameter received in the second cell.

If the RRC message for handover from the first cell to the second cell does not include the second DTX parameter,

- The terminal does not apply in the second cell the first DTX parameter applied in the first cell and
- The terminal does not apply in the second cell the second DTX parameter applied in the first cell.

The terminal and the base station perform DTX operation based on the DTX parameters and the way how to determine the starting subframe of Static_Transmission_Timer.

The first DTX parameter is DTX_Cycle_Offset2 and the second DTX parameter is Static_Transmission_Period_Determination_2.

The terminal and the base station manage the first_counter and the second_counter as below.

The first_counter at a specific time holds system frame number at the specific time.

The second_counter at a specific time holds big frame number at the specific time. A big frame consists with 1024 radio frames.

- The first_counter is initialized based on the value indicated in frame_number field when a system information containing frame_number field is received in a first cell.
- The first_counter increments by one every radio frame.
- When handover towards a second cell is executed,
  - if the terminal is aware that the target cell and the source cell have SFN and frame boundary alignment, the terminal continues to use in the second cell the first_counter used in the first cell.
  - if the terminal is not aware that target cell and the source cell have SFN and frame boundary alignment, the terminal initializes the first_counter based on the value indicated in frame_number in the system information received in the second cell.
    - the terminal is indicated by the base station via a RRC message whether cells in a frequency layer have SFN alignment and frame boundary alignment.
- The second_counter is initialized to one when DTX3-Config is received and the BigFrameNumber is not indicated in the DTX3-Config.>The second_counter is initialized to the value indicated in BigFrameNumber when DTX3-Config is received and the BigFrameNumber is indicated in the DTX3-Config.
- The second_counter is updated based on ReferenceFrameNumber2 and the first SFN.
  - The first SFN is the frame number of the frame when RRC message containing DTX3-Config is received.
  - If the difference between ReferenceFrameNumber2 and first SFN is smaller than or equal to a specific integer (e.g. 256), the second_counter is not updated.

- If the difference between ReferenceFrameNumber2 and first SFN is greater than the specific integer (e.g. 256), the second_counter is updated by one (updated second_counter=second_counter+1).
  - Upon MAC reset for handover, the terminal initializes the second_counter to one.
  - Upon Lower Layer Triggered Mobility (LTM) handover, the base station indicates the terminal whether to reset the second_counter to one or to continue to use the second_counter.
    - The indication can be sent in a MAC Control Element (CE) instructing LTM handover towards the second cell. If a specific field in the MAC CE is set to a first value, the terminal reset the second_counter at a point of time. If the specific field in the MAC CE is set to a second value, the terminal continues to use the second_counter in the second cell.
    - The point of time is after receiving the MAC CE in the first cell and before performing first uplink transmission in the second cell.

Figure 3A:
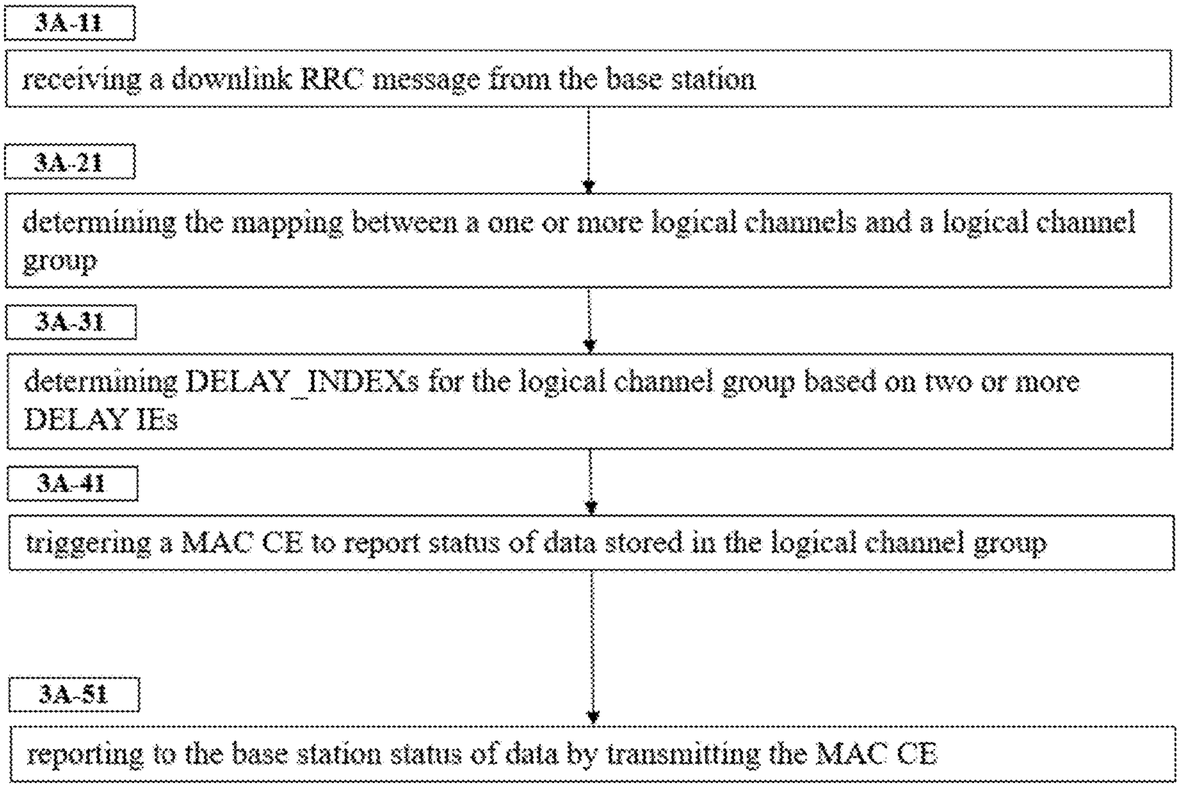
FIG. 3A is a flow diagram illustrating an DTX operation of the terminal.

FIG. 3A is a flow diagram illustrating an operation of a the terminal.

In 3A-11, the terminal receives a downlink RRC message from the base station, the downlink RRC message comprises a one or more logical channel configuration IEs and a one or more logical channel group configuration IEs.

Each of the one or more logical channel configuration IE comprises a normal logical channel group identifier that indicates a logical channel group to which the corresponding logical channel belongs.

Each of the one or more logical channel group configuration IE comprises optionally the normal logical channel group identifier and optionally a shorten logical channel group identifier.

In 3A-21, the terminal determines the mapping between a one or more logical channels and a logical channel group based on the one or more logical channel configuration IEs.

In 3A-31, the terminal constructs two tables for a logical channel group if the logical channel group configuration IE of the logical channel group comprises a field indicating shorten identifier for the logical channel group.

The first table (DYNAMIC_LONG_BS_TABLE) of the logical channel is constructed/generated/built based on a first field (LOWER_BOUND_INDEX_ZERO) and a second field (STEP_LONG) and a first parameter (NUM_INDEX_LONG).

The second table (DYNAMIC_SHORT_BS_TABLE) is constructed/generated/built based on the first field and a third field (STEP_SHORT) and a second parameter (NUM_INDEX_SHORT).

The first field and the second field and the third field are configured for the logical channel group. The first field and the second field and the third field are delivered to the terminal as included in the downlink RRC message.

The first parameter and the second parameter are fixed integers. The terminal and the base station are aware of the values for the first parameter and the second parameter without message exchange.

The first table comprises n buffer size level entries. The second table comprises m buffer size level entries. A buffer size level entry consists of a Buffer Size Index and a Buffer Size value.

FIG. 3A is a flow diagram illustrating an DTX operation of the terminal.

In 3A-11, the terminal receives a downlink RRC message from the base station, the downlink RRC message comprises a one or more logical channel configuration IEs and a one or more logical channel group configuration IEs and one or more LCID configuration IEs.

In 3A-21, the terminal determines the mapping between a one or more logical channels and a logical channel group based on the one or more logical channel configuration IEs.

In 3A-31, the terminal determines DELAY_INDEXs for the logical channel group based on based on two or more DELAY IEs. Each DELAY IE indicates a specific multiple msec. The first/lowest DELAY_INDEX is determined based on a first fixed value and the first IE. The last/highest DELAY_INDEX is determined based on the last IE and a second parameter. The intermediate DELAY_INDEX n is determined based on the nth DELAY IE and (n+1)th DELAY IE.

The second parameter is related to DR MAC CE trigger.

In 3A-41, the terminal triggers a MAC CE to report status of data stored in the logical channel group.

In 3A-51, the terminal reports to the base station status of data by transmitting the MAC CE.

If the MAC CE is a first type MAC CE (LONG_DR), Buffer Size field for the logical channel group is determined based on the first table of the logical channel group. Delay Level field for the logical channel group is determined based on the DELAY_INDEXs of the logical channel group.

If the MAC CE is a second type MAC CE (SHORT_DR), Buffer Size field is determined based on the second table. Buffer Size field for the logical channel group is determined based on the second table of the logical channel group. Delay Level field for the logical channel group is determined based on the DELAY_INDEXs of the logical channel group.

If the MAC CE is a third type MAC CE (LONG_BSR), Buffer Size field is determined based on the third table.

If the MAC CE is a fourth type MAC CE (SHORT_BSR), Buffer Size field is determined based on the fourth table.

Figure 4A:
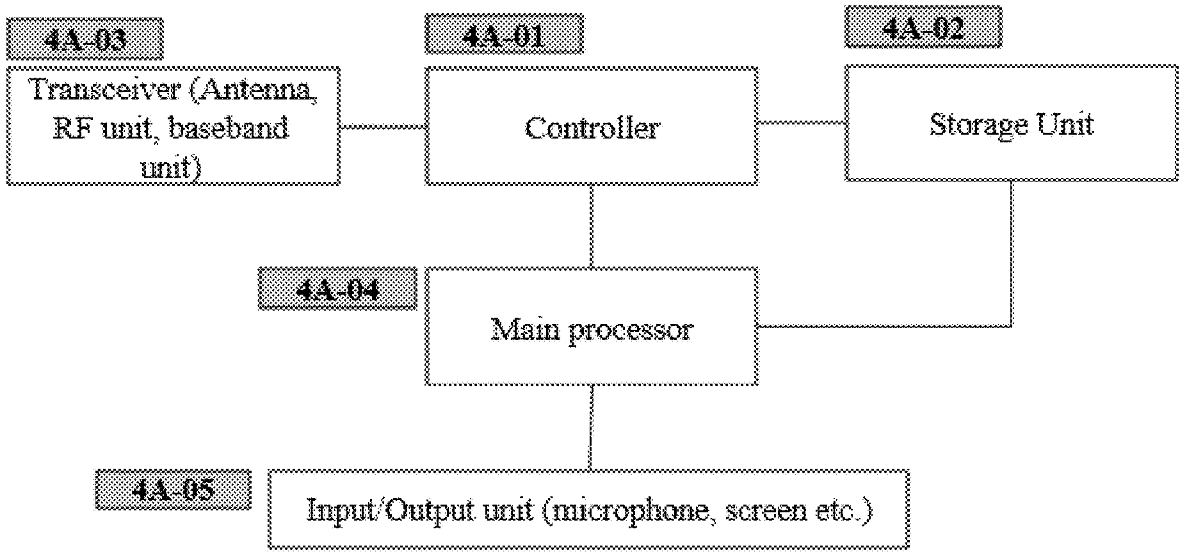
FIG. 4A is a block diagram illustrating the internal structure of a UE to which the disclosure is applied.

FIG. 4A is a block diagram illustrating the internal structure of a Terminal to which the disclosure is applied.

Referring to the diagram, the terminal includes a controller (4A-01), a storage unit (4A-02), a transceiver (4A-03), a main processor (4A-04) and I/O unit (4A-05).

The controller (4A-01) controls the overall operations of the terminal in terms of mobile communication. For example, the controller (4A-01) receives/transmits signals through the transceiver (4A-03). In addition, the controller (4A-01) records and reads data in the storage unit (4A-02). To this end, the controller (4A-01) includes at least one processor. For example, the controller (4A-01) may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit (4A-02) stores data for operation of the terminal, such as a basic program, an application program, and configuration information. The storage unit (4A-02) provides stored data at a request of the controller (4A-01).

The transceiver (4A-03) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (4A-04) controls the overall operations other than mobile operation. The main processor (4A-04) process user input received from I/O unit (4A-05), stores data in the storage unit (4A-02), controls the controller (4A-01) for required mobile communication operations and forward user data to I/O unit (4A-05).

I/O unit (4A-05) consists of equipment for inputting user data and for outputting user data such as a microphone and a screen. I/O unit (4A-05) performs inputting and outputting user data based on the main processor's instruction.

Figure 4B:
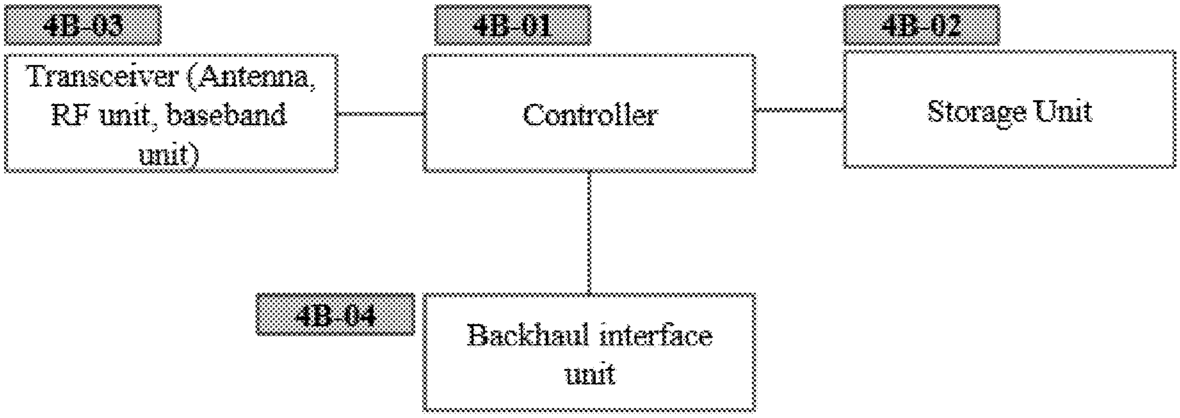
FIG. 4B is a block diagram illustrating the configuration of a base station according to the disclosure.

FIG. 4B is a block diagram illustrating the configuration of a base station according to the disclosure.

As illustrated in the diagram, the base station includes a controller (4B-01), a storage unit (4B-02), a transceiver (4B-03) and a backhaul interface unit (4B-04).

The controller (4B-01) controls the overall operations of the main base station. For example, the controller (4B-01) receives/transmits signals through the transceiver (4B-03), or through the backhaul interface unit (4B-04). In addition, the controller (4B-01) records and reads data in the storage unit (4B-02). To this end, the controller (4B-01) may include at least one processor. The controller controls transceiver, storage unit and backhaul interface such that base station operation illustrated in FIG. 2A are performed.

The storage unit (4B-02) stores data for operation of the main base station, such as a basic program, an application program, and configuration information. Particularly, the storage unit (4B-02) may store information regarding a bearer allocated to an accessed UE, a measurement result reported from the accessed UE, and the like. In addition, the storage unit (4B-02) may store information serving as a criterion to deter mine whether to provide the terminal with multi—connection or to discontinue the same. In addition, the storage unit (4B-02) provides stored data at a request of the controller (4B-01).

The transceiver (4B-03) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (4B-04) provides an interface for communicating with other nodes inside the network. The backhaul interface unit (4B-04) converts a bit string transmitted from the base station to another node, for example, another base station or a core network, into a physical signal, and converts a physical signal received from the other node into a bit string.

Below table lists acronym used in the present invention.

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A method by a terminal, the method comprising:

receiving, by the terminal from a base station, a first Radio Resource Control (RRC) message, wherein the first RRC message comprises one or more sets of logical channel group parameters;

triggering, by the terminal, a specific Medium Access Control (MAC) Control Element (CE) for a specific logical channel group in case that a remaining time until discarding of one or more protocol data units (PDUs) of the specific logical channel group becomes less than a threshold;

receiving, by the terminal from the base station, a second RRC message, wherein the second RRC message causes reconfiguration with synchronization from a first cell to a second cell;

canceling, by the terminal, the specific MAC CE; and triggering, by the terminal, a new specific MAC CE for the specific logical channel group in case that the reconfiguration with synchronization from the first cell to the second cell is successfully completed, wherein the specific MAC CE and the new specific MAC CE each comprise a field indicating the remaining time until discarding.

2. The method of claim 1, wherein the triggering of the new specific MAC CE in response to successful completion of the reconfiguration with synchronization is performed based on the one or more sets of logical channel group parameters in the second RRC message in case that the second RRC message comprises the one or more sets of logical channel group parameters.

3. The method of claim 1, wherein the first RRC message further comprises one or more sets of logical channel parameters.

4. The method of claim 3, wherein each of the one or more sets of logical channel parameters is associated with each of one or more logical channels.

5. The method of claim 4, wherein a logical channel belongs to a logical channel group in case that a specific parameter is comprised in a set of logical channel parameters of the logical channel.

6. The method of claim 1, wherein the specific MAC CE further comprises:

a field indicating a buffer size; and a field indicating a buffer size table.

7. The method of claim 6, wherein the field indicating the buffer size comprises an index associated with a buffer size range.

8. The method of claim 7, wherein the field indicating the buffer size table comprises an index associated with the buffer size table.

9. The method of claim 1, wherein each of the one or more sets of logical channel group parameters is associated with each of one or more logical channel groups.

10. The method of claim 9, wherein a set of logical channel group parameters associated with a logical channel group comprises:

a parameter indicating an identifier of the logical channel group; and a parameter indicating a delay threshold of the logical channel group.

11. The method of claim 10, wherein each of the one or more sets of logical channel group parameters further comprises one or more parameters related to the field indicating the remaining time until discarding.

12. The method of claim 1, wherein the first RRC message further comprises a set of configured grant parameters.

13. The method of claim 12, wherein two or more configured grants are configured based on the set of configured grant parameters.

14. The method of claim 12, wherein the set of configured grant parameters comprises:

a first subset of parameters; and a second subset of parameters.

15. The method of claim 14, wherein a frequency resource of the two or more configured grants is determined based on the first subset of parameters.

16. The method of claim 14, wherein a time resource of each of the two or more configured grants is determined based on the second subset of parameters.

17. The method of claim 14, wherein control information on an unused configured grant is transmitted by the terminal based on two or more configured grants.

18. The method of claim 17, wherein a number of bits in the control information is determined based on a specific set of parameters.

19. A terminal comprising:

a transceiver, a memory, and a controller coupled to the transceiver and the memory, wherein the controller is configured to cause the terminal to:

receive, from a base station, a first Radio Resource Control (RRC) message, wherein the first RRC message comprises one or more sets of logical channel group parameters, trigger a specific Medium Access Control (MAC) Control Element (CE) for a specific logical channel group in case that a remaining time until discarding of one or more protocol data units (PDUs) of the specific logical channel group becomes less than a threshold, receive, from the base station, a second RRC message, wherein the second RRC message causes reconfiguration with synchronization from a first cell to a second cell, cancel the specific MAC CE, and trigger a new specific MAC CE for the specific logical channel group in case that the reconfiguration with synchronization from the first cell to the second cell is successfully completed, wherein the specific MAC CE and the new specific MAC CE each comprise a field indicating the remaining time until discarding.

* * * * *